United States Patent
Juhasz et al.

(10) Patent No.: US 10,605,490 B2
(45) Date of Patent: Mar. 31, 2020

(54) ENERGY COLLECTOR

(71) Applicant: Tenkiv, Inc., Sacramento, CA (US)

(72) Inventors: William Juhasz, Sacramento, CA (US); Zachary Juhasz, Sacramento, CA (US)

(73) Assignee: TENKIV, INC., Sacramento, CA (US)

( * ) Notice: Subject to any disclaimer, the term of this patent is extended or adjusted under 35 U.S.C. 154(b) by 0 days.

(21) Appl. No.: 16/058,811

(22) Filed: Aug. 8, 2018

(65) Prior Publication Data

US 2019/0049153 A1 Feb. 14, 2019

Related U.S. Application Data

(60) Provisional application No. 62/542,409, filed on Aug. 8, 2017.

(51) Int. Cl.
| | |
|---|---|
| *F24S 10/55* | (2018.01) |
| *F24S 60/10* | (2018.01) |
| *F24S 20/66* | (2018.01) |
| *F24S 10/50* | (2018.01) |
| *F24S 20/67* | (2018.01) |
| *F24S 70/20* | (2018.01) |
| *F24S 80/20* | (2018.01) |
| *F24S 80/54* | (2018.01) |

(Continued)

(52) U.S. Cl.
CPC .............. *F24S 60/10* (2018.05); *F24S 10/504* (2018.05); *F24S 10/55* (2018.05); *F24S 20/66* (2018.05); *F24S 20/67* (2018.05); *F24S 70/20* (2018.05); *F24S 80/20* (2018.05); *F24S 80/54* (2018.05); *F24S 2025/011* (2018.05); *F24S 2025/6007* (2018.05); *F24S 2080/011* (2018.05); *F24S 2080/09* (2018.05)

(58) Field of Classification Search
CPC ...................................................... F24S 60/00
USPC .................................................. 126/618, 666
See application file for complete search history.

(56) References Cited

U.S. PATENT DOCUMENTS

| | | | | |
|---|---|---|---|---|
| 3,961,619 A | * | 6/1976 | Estes ....................... | F24S 80/30 126/666 |
| 3,985,116 A | * | 10/1976 | Kapany .................. | F24S 70/25 126/687 |

(Continued)

FOREIGN PATENT DOCUMENTS

| | | |
|---|---|---|
| DE | 202006016100 U1 | 12/2006 |
| DE | 102010060289 A1 | 5/2011 |

(Continued)

OTHER PUBLICATIONS

Arya, Farid et al, "Current Developments in Flat-Plate Vacuum Solar Thermal Collectors", World Acad. of Sci., Engin. and Technol. Internat. Jrnl. of Energy and Power Engin., vol. 10, No. 6, 2016, pp. 715-719.

(Continued)

*Primary Examiner* — Avinash A Savani
(74) *Attorney, Agent, or Firm* — Dorsey & Whitney LLP

(57) ABSTRACT

An energy collector is disclosed. The energy collector contains an absorber and a working fluid. The working fluid is held in a state of two-phase equilibrium to minimize sensible heating and thus heat losses to the environment. The energy collector may be held under a vacuum to further prevent heat losses to the ambient environment. One or more energy collectors may be connected to other energy collectors, end uses, or thermal energy storage.

20 Claims, 17 Drawing Sheets

(51) Int. Cl.
  *F24S 25/00* (2018.01)
  *F24S 25/60* (2018.01)
  *F24S 80/00* (2018.01)

(56) References Cited

U.S. PATENT DOCUMENTS

| | | | |
|---|---|---|---|
| 4,324,230 A | | 4/1982 | Lunsford |
| 6,713,008 B1 | * | 3/2004 | Teeter .................. B29C 70/025 264/240 |
| 2014/0341645 A1 | * | 11/2014 | Liu .......................... F16B 2/065 403/311 |
| 2017/0123122 A1 | | 5/2017 | Ballif et al. |

FOREIGN PATENT DOCUMENTS

| | | |
|---|---|---|
| DE | 102010010899 A1 | 9/2011 |
| GB | 2117109 A | 10/1983 |
| JP | S56110842 A | 9/1981 |
| WO | 2012176133 A1 | 12/2012 |

OTHER PUBLICATIONS

Ashrae Standard, "Methods of Testing to Determine the Thermal Performance of Solar Collectors", American Society of Heating, Refrigerating and Air-Conditioning Engineers, Inc., 1991, 45 pages.

Genersys Solar, "Genersys 1450 Flat Plate Vacuum Solar Collector", The World's only panel combining the advantages of both flat plate aesthetics and vacuum technology, 2008, 2 pages.

Genersys Solar, "Genersys 1850 Super Hot Flat Plate Vacuum Solar Collector", The World's only panel combining the advantages of both flat plate aesthetics and vacuum technology, intended for Industrial and Commercial use, 2008, 2 pages.

International Standard ISO 9806, "Solar Energy—Solar Thermal Collectors—Test Methods", Reference No. ISO9806:2017(E), 2017, 99 pages.

PCT, "International Search Report", Application No. PCT/US2018/045803, dated Dec. 20, 2018, 6 pages.

Polvongsri, Sarawut, "Ashrae Standard 93-2003 Methods of Testing to Determine the Thermal Performance of Flat-Plate Solar Collectors", Sch. of Renewable Energy Maejo Univ. Thermal Syst. Res. Unit; Dep. of Mech. Engin. Faculty of Engin. Chiang Mai Univ., Aug. 5-9, 2013, 15 pages.

* cited by examiner

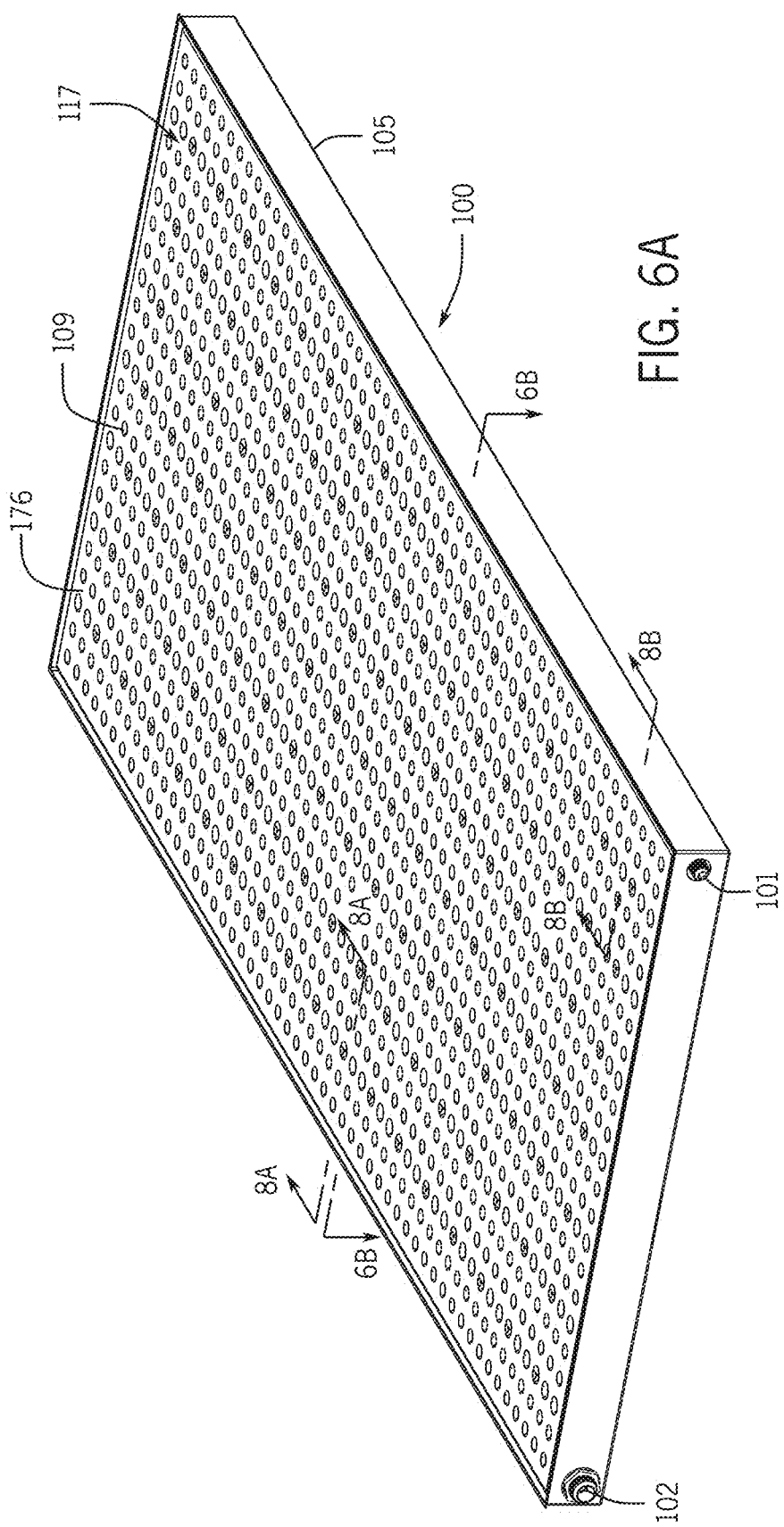

ENERGY COLLECTOR

CROSS REFERENCE TO RELATED APPLICATIONS

This application claims the benefit of U.S. Provisional Application No. 62/542,409, filed on Aug. 8, 2017 and entitled "Energy Collector," the entirety of which is incorporated herein by reference for all purposes.

TECHNICAL FIELD

This disclosure relates generally to the field of energy collectors.

BACKGROUND

The sun is an abundant source of energy. There are many types of mechanisms for capturing and utilizing energy captured from the sun. For example, photovoltaic solar panels convert solar radiation into electricity that can be used, or stored for later use. However, conventional solar panels typically include expensive components and do not have long lifespans. As such, there is a need for an improved mechanism for capturing and utilizing solar heat, that can be cheaply manufactured and installed, as well as be sufficiently robust to have a long lifespan.

The information included in this Background section of the specification, including any references cited herein and any description or discussion thereof, is included for technical reference purposes only and is not to be regarded as subject matter by which the scope of the invention, as defined in the claims, is to be bound.

SUMMARY

An energy collector is disclosed. The energy collector has a base for supporting the energy collector on a support surface. A plurality of support features are positioned within and operably coupled to the base, each support feature defining an alignment recess. An absorber absorbs solar radiation. The absorber comprises a first heat retaining member comprising a plurality of first heat retaining member apertures defined therethrough. A second heat retaining member, defining a plurality of second heat retaining member apertures therethrough, is operably coupled to the first heat retaining member so as to define a fluid cavity therebetween. The fluid cavity is configured to receive a working fluid therein. The first heat retaining member is coupled to and aligned with the second heat retaining member such that the first heat retaining member apertures and the second heat retaining member apertures are aligned with one another. A plurality of alignment protrusions are coupled to the absorber, each of the alignment protrusions having a shape corresponding to at least one alignment recess. The plurality of alignment protrusions are received within the plurality of alignment recesses to align the absorber and the base. A plurality of force distribution pillars are coupled to the base and received through the first heat retaining member apertures and the second heat retaining member apertures of the absorber. A radiation penetrable cover is coupled to the base and positioned on an end of the plurality of force distribution pillars, such that the force distribution pillars support the radiation penetrable cover at a set distance from the absorber. A base manifold is defined between the second heat retaining member and a top surface of the base. The base manifold is under vacuum such that as the absorber absorbs radiation from a radiation source, the working fluid experiences a phase change.

A system of energy collectors is disclosed. Each energy collector has a base for supporting the energy collector on a support surface. A plurality of support features are positioned within and operably coupled to the base, each support feature defining an alignment recess. An absorber absorbs solar radiation. The absorber comprises a first heat retaining member comprising a plurality of first heat retaining member apertures defined therethrough. A second heat retaining member, defining a plurality of second heat retaining member apertures therethrough, is operably coupled to the first heat retaining member so as to define a fluid cavity therebetween. The fluid cavity is configured to receive a working fluid. The first heat retaining member is coupled to and aligned with the second heat retaining member such that the first heat retaining member apertures and the second heat retaining member apertures are aligned with one another. A plurality of alignment protrusions are coupled to the absorber, each of the alignment protrusions having a shape corresponding to at least one alignment recess. The plurality of alignment protrusions are received within the plurality of alignment recesses to align the absorber and the base. A plurality of force distribution pillars are coupled to the base and received through the first heat retaining member apertures and the second heat retaining member apertures of the absorber. A radiation penetrable cover is coupled to the base and positioned on an end of the plurality of force distribution pillars, such that the force distribution pillars support the radiation penetrable cover at a set distance from the absorber. A base manifold is defined between the second heat retaining member and a top surface of the base. The base manifold is under vacuum such that as the absorber absorbs radiation from a radiation source, the working fluid experiences a phase change.

A method of absorbing solar radiation in a working fluid is disclosed. The method comprises the steps of: evacuating an absorber of gas, filling the absorber with a working fluid, sealing the absorber, absorbing solar radiation in the working fluid contained in the absorber such that it vaporizes, collecting the vapor, using the vapor for one or more end uses that extract energy from the vapor, turning the vapor back into liquid, and returning the liquid to the absorber.

A test method is also disclosed. The method comprises the steps of: filling an energy collector with a working fluid, connecting an energy collector to a thermal energy storage device, raising the temperature of the energy collector to a predetermined temperature, activating a pump to circulate the working fluid throughout the energy collector, removing the heat source, measuring the rate of change of temperature of the working fluid, calculating the rate of heat loss, and calculating the efficiency of the energy collector.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the present invention as defined in the claims is provided in the following written description of various embodiments of the invention, and illustrated in the accompanying drawings.

BRIEF DESCRIPTION OF THE DRAWINGS

FIG. 6A is a partially deconstructed view of an energy collector with an absorber installed, according to various embodiments.

DETAILED DESCRIPTION

Overview

Figure 1:
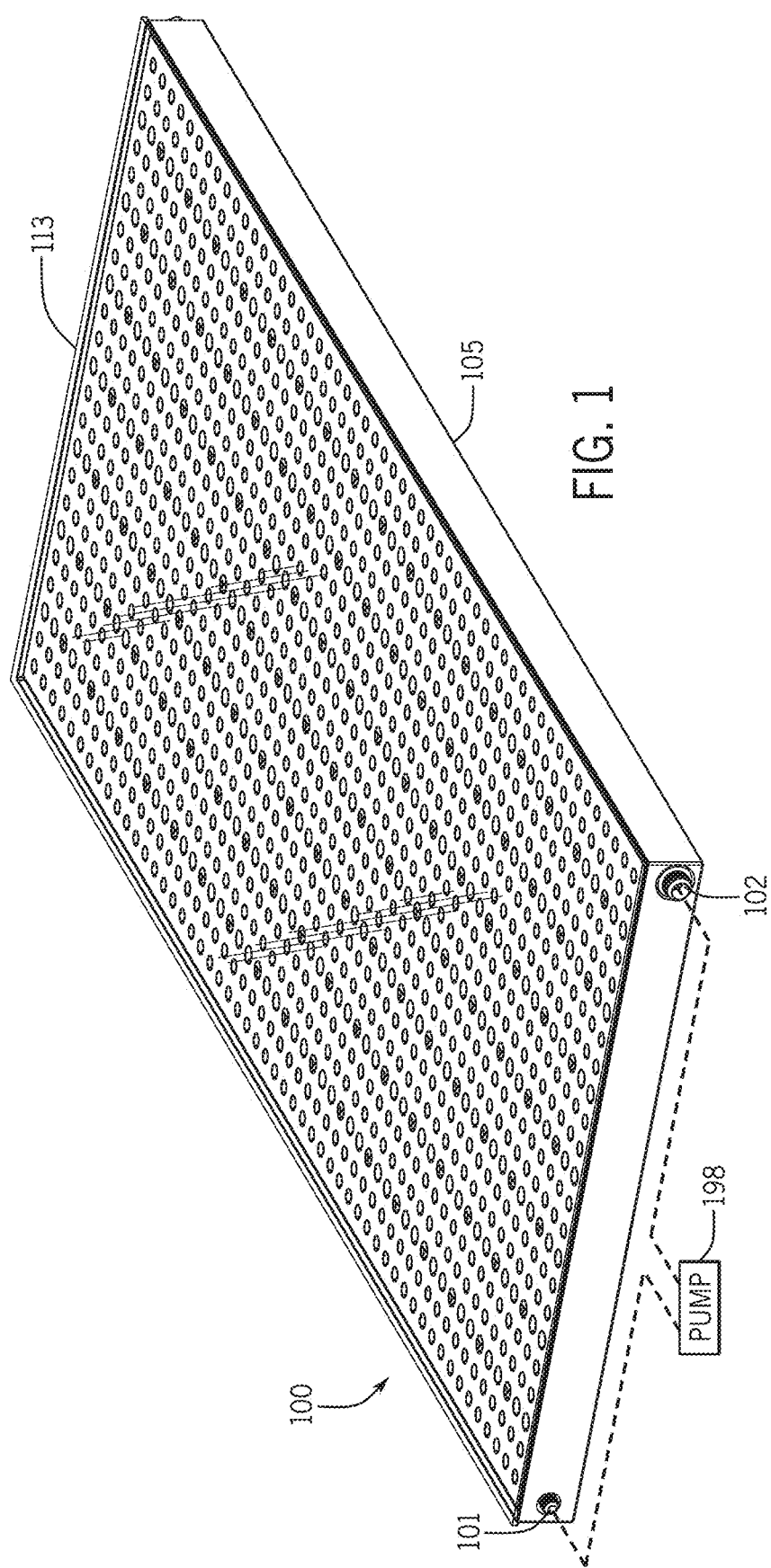
FIG. 1 is an isometric view of an energy collector according to various embodiments.

The present disclosure is generally directed toward an energy collector. The energy collector captures energy emitted from the sun and stores the energy for various uses. In some examples, that energy is transferred to a working fluid. The energy absorbed may make some of the working fluid change from a liquid to a vapor. Most of the energy absorbed is used to turn the working fluid from a liquid to a vapor, thereby minimizing temperature increases in the energy collector. By reducing increases in temperature, energy losses from the energy collector are minimized.

In some examples, once vapor is formed, it is then collected and either stored, or used for a variety of purposes. Once the heat energy from the vapor is used in an end use, the vapor may condense back into a liquid, and recirculate to the energy collector.

The energy collector may have a base that supports and provides structure to the rest of the components. An absorber is positioned within the base and acts to absorb solar energy, which is then transferred to the working fluid that may be flowing within in a fluid cavity defined by the absorber. The absorber may include two heat retaining bodies that have spacing features therein, so that when the two are coupled together along a longitudinal length and sealed, they define a void or manifold between them, the void or working fluid compartment receives the working fluid therein. The top face of a first heat retaining body may be arranged within the base so as to be exposed to the sun when the collector is installed. The bottom face of the first heat retaining body is exposed and in contact with the working fluid.

The top face of the second heating retaining body is oriented to face the bottom face of the first heat retaining body. In this way, the adjacent faces of the first and second heat absorbing bodies define a dual-surface contact area that contacts the working fluid. As both heat retaining bodies include exposed faces that define the contact area, the contact with the working fluid is sufficiently large, e.g., across the top and bottom surface areas of the heat retaining bodies, that the heat retaining bodies may be made of inexpensive metals that may not conduct heat well, reducing costs of the energy collector. Conventional energy collectors usually include small surface areas forming a heat absorbing body and therefore require expensive, highly heat conductive materials. In some embodiments, the working fluid may contact a substantial portion of the interior surfaces of the heat retaining bodies, but in other examples may contact less.

One or more support features support the absorber within the base. In one embodiment, the support features may be ceramic fiber blocks and may include alignment features that couple with mating alignment features mounted to or formed from the absorber so that the base and the absorber can be easily aligned during assembly. In other examples, the support features are magnets that provide a support force for the absorber within the base.

A radiation penetrable cover is positioned above the absorber (e.g., above the top heat retaining body of the absorber) and is coupled to the base, such that the base and cover define an enclosure space or vacuumed area for the energy collector. As will be discussed below, the enclosure space is held under vacuum to insulate the absorber from the environment, but also allows solar energy to enter the collector.

In some embodiments, a base manifold is defined between a bottom surface of the second heat retaining member of the absorber and a top surface of the base. The base manifold is not in fluid communication with the absorber or the working fluid, e.g., is fluidly separated or otherwise sealed from the working fluid flowing within the absorber. The base manifold may be filled with insulation material. In some embodiments, the insulation material may be arranged in layers, such as multi-layer insulation. In other embodiments, the insulation material may be a bulk material. The insulation material further reduces heat loss to the environment, increasing the efficiency of the collector.

The force generated on the radiation penetrable cover when the sealed assembly is under vacuum, for example, in the range of between 0.1 and 100 Pascal, may be up to 203,000 Newtons (approximately 46,000 pounds force) on a 2 square meter energy collector. To support the cover under such conditions, the energy collector may include force distribution pillars, which act to spread out the compressive forces of the vacuum across the area of the cover. The force distribution pillars may be mounted to the base, pass through the absorber, and support the cover. In some embodiments, the force distribution pillars pass through the absorber through one or more predefined heat retaining member apertures, which may be sufficiently wide to ensure that the force distribution pillars do not contact the absorber to prevent heat transfer losses therethrough.

In some embodiments, the force distribution pillars may be made of two pieces: a force distribution pillar base and a head positioned therein. The head may be flared and narrow in width from a top portion down to a neck that passes through one of the heat retaining member apertures in the absorber. This flared shape allows the force distribution pillars to simultaneously distribute the force on the cover plate, while minimizing the size of the heat retaining member apertures, ensuring a larger heat absorption surface area.

Because manufacturing tolerances can vary for the force distribution pillars, and the energy collector base and the radiation penetrable cover may not be perfectly flat, in some examples, the heads of the force distribution pillars may have a sealing compound connected thereto. The sealing compound may be a fluid impermeable material. Including this material on the top surfaces of the force distribution pillar heads to secure them to the radiation penetrable cover allows for more variation in manufacturing tolerances, reducing costs, while still ensuring even support for the radiation penetrable cover.

The energy collector can function as a standalone unit or may be coupled together with one or more energy collectors to define an energy collection system. In these embodiments, the energy collection system may remain under vacuum, reducing heat energy losses from the working fluid vapor. For example, the connection conduits, valves, and connectors, may be vacuum insulated and may be wrapped with insulation or otherwise insulated from energy losses.

In some embodiments, connection conduits may be configured to accommodate thermal expansion among the various system components, without experiencing failure. For example, the connection conduits may be corrugated or include expansion material or features that allow the connection conduits to expand or contract in length and size. In some examples, the devices may be connected to a common vacuum manifold and vacuum pump or pumps to allow the vacuum in the system to be continuously pulled. In some examples, the energy collectors may be used as an outer layer of building insulation, as an outer layer of roofing material, or as a structural member for a roof. Due to the vacuum and other insulation features, the energy collector may provide insulation for the building or structure, while still functioning to collect solar energy.

Systems of energy collectors may be connected together to form even larger systems. For example, many buildings having energy collector systems installed on them may be connected together to form heating districts. Such districts may take advantage of economies of scale by building large, centralized thermal energy storage devices, and large end uses. This approach may help keep an energy collector system operational, even if part of its collectors are obscured by shade, for instance by patchy clouds, or shadows from trees, buildings, or other obstructions.

In some examples, an energy collector or system of energy collectors may be connected to a storage mechanism, such as a fluid heater or battery, or may be connected directly to an end use module. For example, an energy collector, or system of energy collectors, may be connected to a sanitization module and the energy collected by the collector may be used to sanitize water for drinking; domestic, commercial, or industrial water heating; driving a heat engine to generate motive power or electricity; or building space heating or cooling.

In one example of a sanitization module, working fluid vapor from an energy collector, or system of energy collectors, may pass into the module. Heat energy from the working fluid vapor may be transferred to a product to be sanitized. In one example, non-potable water may be fed into the sanitization module. Heat energy released from the working fluid vapor may heat the non-potable water to a temperature, for a sufficient length of time, where biological contaminants in the water are de-activated, killed, or otherwise made non-harmful. Thus, the sanitization module may render non-potable water potable, or safe for consumption by humans, pets or livestock. The sanitization module could, in other examples, be used to sanitize other products, such as surgical instruments, waste, bedding, packaging materials, foodstuffs, or tools.

In another example, working fluid vapor from an energy collector, or system of energy collectors, may pass into a heating module to heat water for use in residential, commercial, or industrial buildings. For example, heat energy from the working fluid vapor may be transferred to water to be heated. The heated water could be used for a variety of purposes, including bathing, space heating, cleaning, dish washing, or to provide heat to any number of industrial processes.

In another example of an end use module, the working fluid vapor from an energy collector, or system of energy collectors, may pass into a heat engine module to convert the heat energy into electrical energy. Once converted, the electrical energy could be used for any purpose for which electricity is appropriate. In other examples, the heat engine may be used to drive loads mechanically, without conversion to electricity. For example, a heat engine could drive fans, pumps, compressors, pulleys, grinders, wheels, mills, or any other device that relies on an input of rotary motion to operate.

In another example of an end use module, the working fluid vapor from an energy collector, or system of energy collectors, may pass into an absorption chiller module. Heat from the working fluid vapor may be used to drive an absorption chiller, which uses heat to provide cooling functions. The cooling functions may be, for example, space cooling, refrigeration, or to provide cooling to industrial processes or machinery.

In some embodiments, the energy collector may include selectively transmissive coatings that enhance the energy absorption efficiency and/or allow the collector to be used for specialized applications. The transmissive coatings are applied to one or both of the exterior and interior surfaces of the cover. The selective transmissive coating may absorb select wavelengths of energy, while reflecting others, which may allow the energy collector to be used for passive building cooling as well as collecting solar energy.

DETAILED DESCRIPTION

Figure 2:
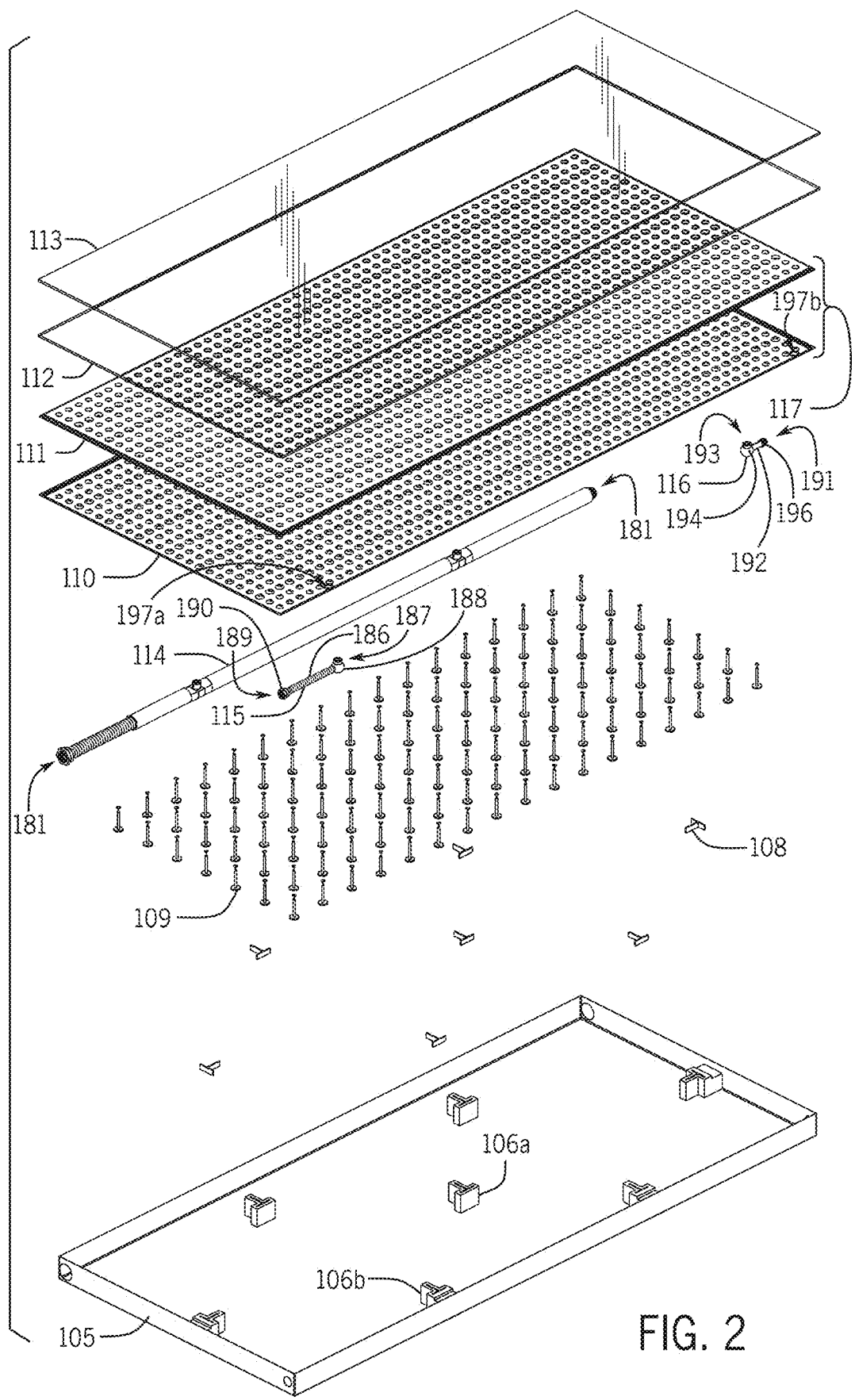
FIG. 2 is an exploded view of an energy collector according to various embodiments.

Now with reference to the figures, the energy collector will be discussed in more detail. FIG. 1 illustrates an isometric view of an energy collector 100. FIG. 2 illustrates an exploded view of the energy collector 100 of FIG. 1. The energy collector 100 includes a base 105, an absorber 117, one or support features 106, one or more force distribution pillars 109, an insulation layer 156 (FIG. 8A), a working fluid 157 (FIG. 6B), and a radiation penetrable cover 113. The energy collector 100 may be coupled to one or more pumps 198. Each component is discussed in turn below.

The energy collector 100 captures solar energy and converts it into usable energy. When assembled, the energy collector 100 absorbs solar radiation energy via the absorber 117 and transfers the radiation energy to the working fluid 157. The working fluid 157 typically is a mixture of vapor and liquid, such that when energy is added to the energy collector 100, the energy causes the working fluid 157 to experience a phase change from liquid to vapor. When exposed to solar insolation (Si), a portion of the working fluid 157 vaporizes, and the energy collector 100 produces a flow rate (m) of working fluid 157 vapor. The efficiency (Ce) of the energy collector may be expressed by equation 1.

$$Ce = \frac{Ev \times m}{Si \times Ca} \quad (1)$$

In the above equation 1, Ev represents the enthalpy of vaporization of the working fluid 157, and Ca represents the active area of the energy collector 100. The energy transferred to the working fluid 157 is harnessed by the collector 100 and thus able to be used for substantially any application or device that requires energy.

The Base

Figure 3:
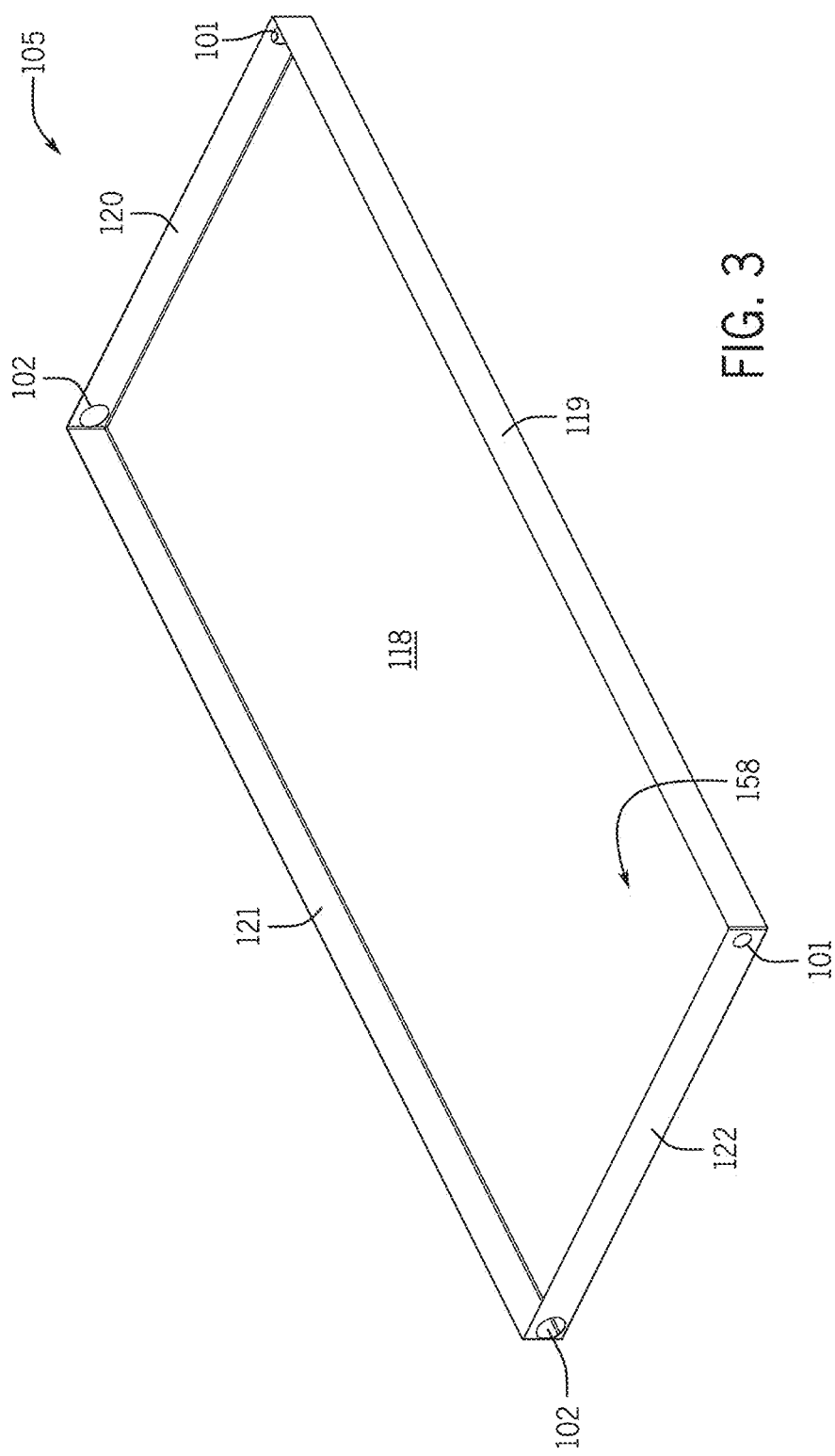
FIG. 3 is an isometric view of a base of an energy collector according to various embodiments.

Referring to FIGS. 1-5, the base 105 defines an enclosure for the energy collector 100 and supports the energy collector 100 on a support surface, such as a rooftop or other structure. As shown in FIG. 3, the base 105 has a bottom 118 and four walls 119, 120, 121, and 122 extending upwards from a perimeter of the bottom 118 defining an enclosure cavity 158 therebetween. The height of the walls 119, 120, 121, and 122 is selected based on a desired thickness of the energy collector, as well as the vacuum and fluid manifolds discussed below. The walls 119, 120, 121, 122 may be generally perpendicular to the bottom surface 118 or may be positioned at other orientations relative thereto. The walls 119, 120, 121, 122 may include one or more ports 101, 102 defined therein. Each of the ports 101, 102 may be in fluid communication with the enclosure cavity 158 to allow fluid to flow in and out of the base 105. One or more liquid inlet ports 101 may supply working fluid 157 liquid to the energy collector 100, while one or more vapor outlet ports 102 may convey working fluid 157 vapor to another energy collector 100, a thermal storage device, or an end use. As shown in FIG. 3, each wall 120, 122 defines a liquid inlet port 101 and a vapor outlet port 102, such that the base 105 may define four ports.

Either one of the ports 101, 102 may also be in fluid communication with one or more pumps 198. The one or more pumps 198 may include a fluid pump and/or a vacuum pump. The fluid pump 198 may circulate working fluid 157 throughout the energy collector 100 and to an end use, energy storage, or another energy collector 100. The vacuum pump 198 may be in fluid communication with the absorber 117 and may extract air from the absorber 117 to create a vacuum environment within the absorber 117. The one or more pumps 198 may be external to the energy collector 100; however, it is also contemplated that the one or more pumps 198 may be contained within the energy collector 100. In another embodiment, the pump 198 may be omitted and the working fluid 157 may be circulated solely through the vaporization and condensation of the working fluid 157 in a circuit.

The base 105 may be made from any suitable material compatible with the expected operating and storage temperatures of the energy collector 100 in the range of −60° C. to over +120° C. The base 105 is also sufficiently strong and rigid that it will not deform unacceptably when it is sealed and the gas inside is evacuated. For example, the base 105 may be made from wood, wood laminates, glass, quartz, iron, steel, stainless steel, thermoplastic, thermosetting plastic, aluminum, copper, bronze, brass, titanium, epoxy fiber composites, ceramic, or composites or alloys made of combinations of these or other materials.

The base 105 holds and acts as a container and foundation for the rest of the components of the energy collector 100. The base 105 supports one or more edge support features 106b and one or more interior support features 106a (collectively "support features 106"). As shown in FIG. 2, the base 105 may also enclose one or more force distribution pillars 109 that support a radiation penetrable cover 113.

The Support Features

Figure 4:
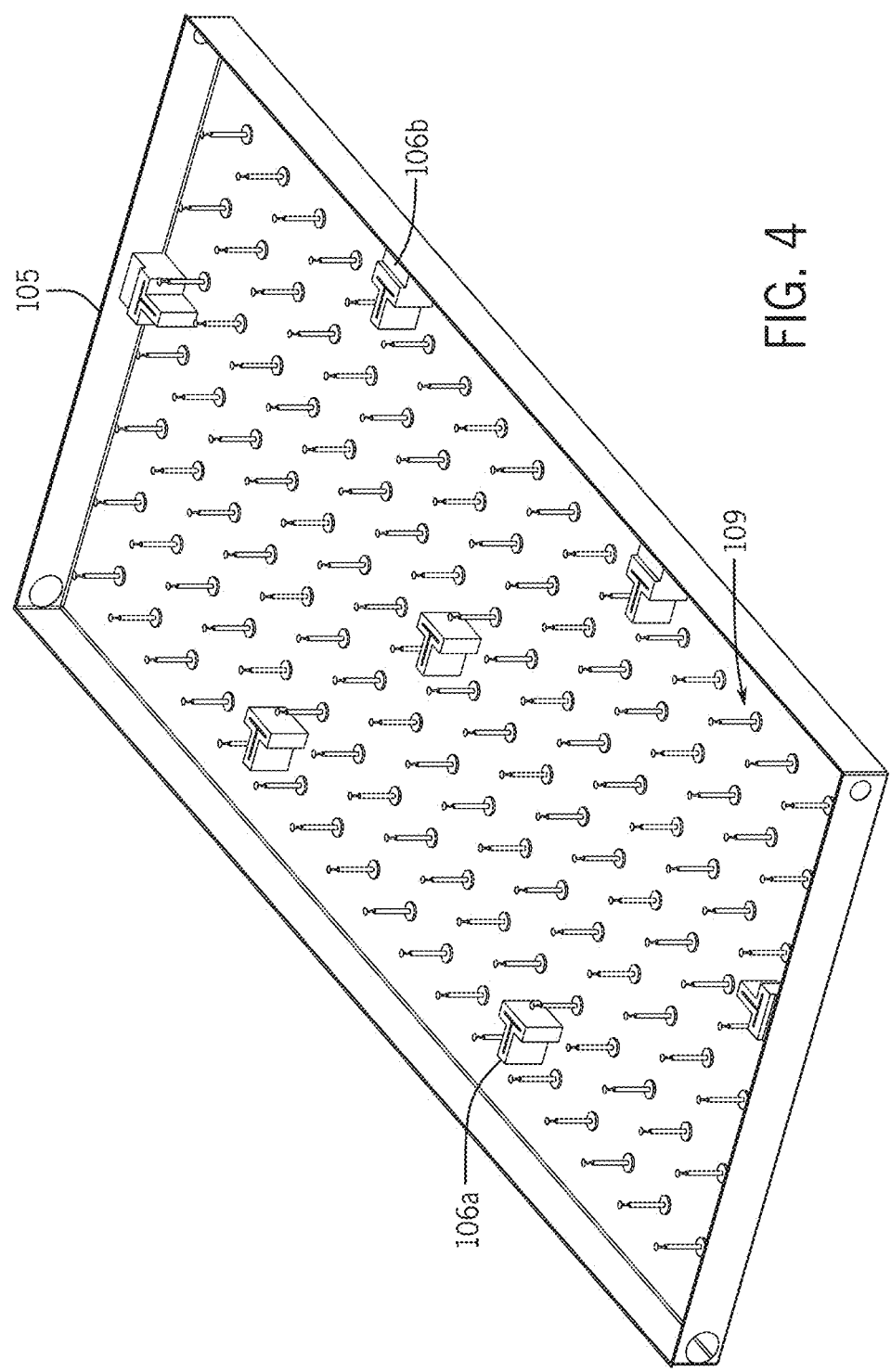
FIG. 4 is a partially deconstructed view of an energy collector, showing interior and edge support features, and force distribution pillars, according to various embodiments.
Figure 5A:
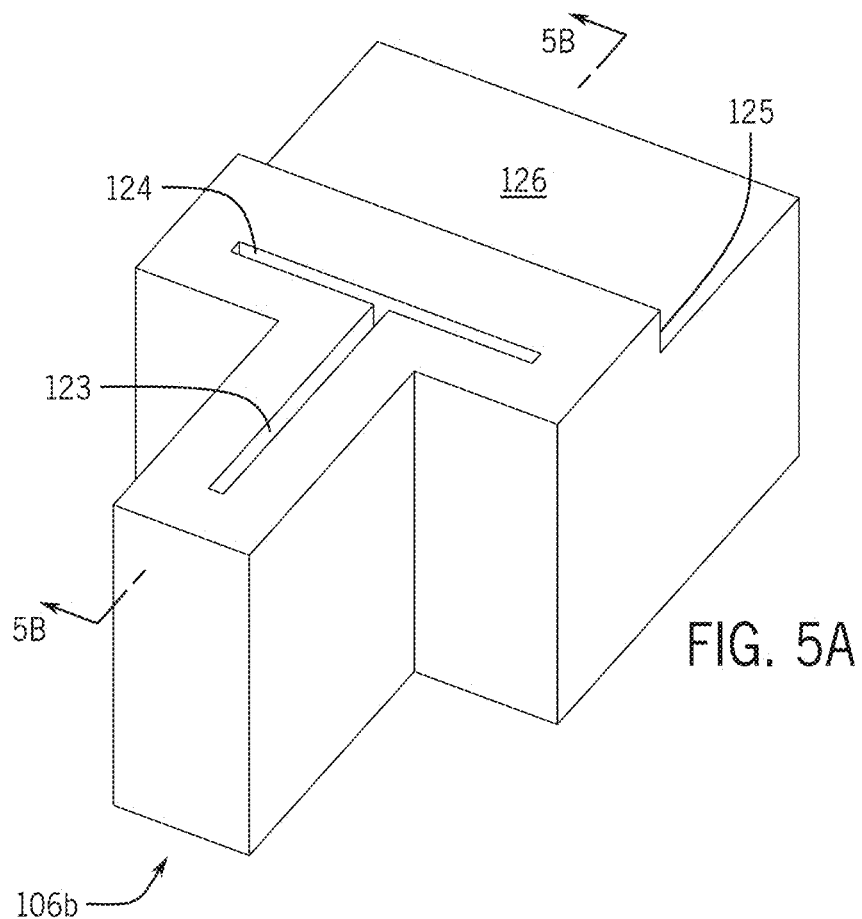
FIG. 5A is an isometric view of an edge support feature of an energy collector according to various embodiments.
Figure 5B:
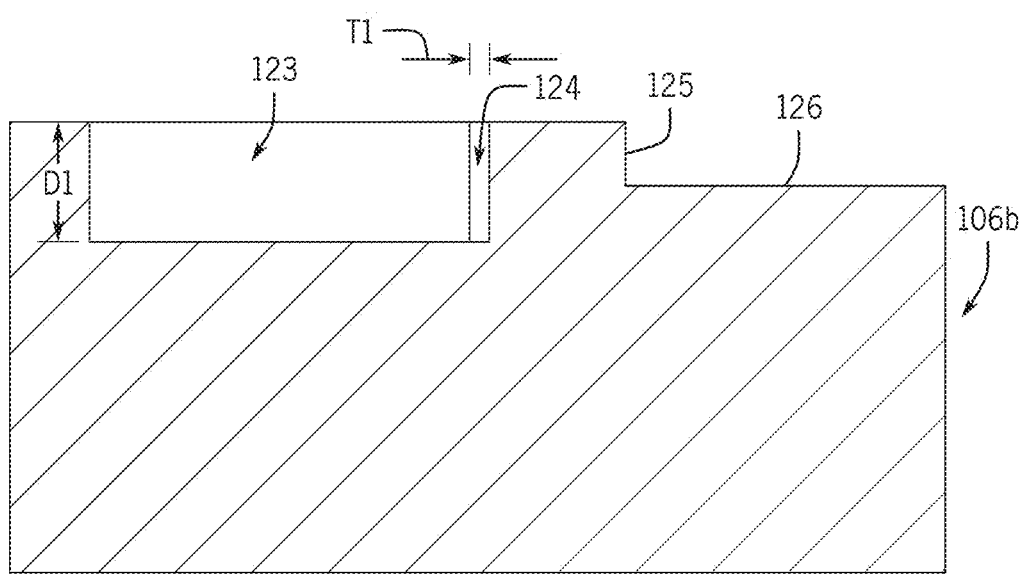
FIG. 5B is a detailed view of a cross section of the edge support feature of FIG. 5A taken along section line 5B-5B.
Figure 5C:
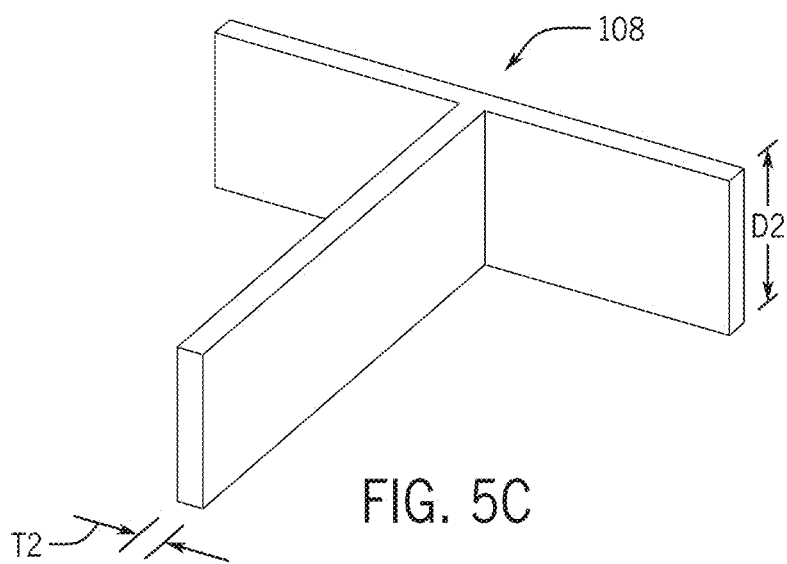
FIG. 5C is an isometric view of an alignment protrusion of an energy collector according to various embodiments.

In one embodiment, support features 106 support the absorber 117 within the base 105 of energy collector 100, while minimizing energy losses to the surrounding environment. FIG. 4 is an isometric view of a partially assembled embodiment of an energy collector 100 of FIGS. 1-3. FIGS. 5A-5E illustrate various views of the support features 106. With reference to FIGS. 4-5E, in one embodiment, the support features 106 may be thermal insulators to prevent or reduce heat transfer between the absorber and the base. For example, the support features may be made of ceramic, ceramic fiber, rigidized fiberglass, foamglass, firebrick, or aerogel.

In one embodiment, the support features 106 may include one or more edge support features 106b and one or more interior support features 106a. FIG. 5A is an isometric view of one embodiment of an edge support feature 106b. The edge support feature 106b may include a step feature 125 and a recessed face 126 and two intersecting alignment recesses 123 and 124 for receiving an alignment protrusion 108. As shown in FIG. 5B, the alignment recesses 123 and 124 each have a depth D1 and a thickness T1.

Figure 5D:
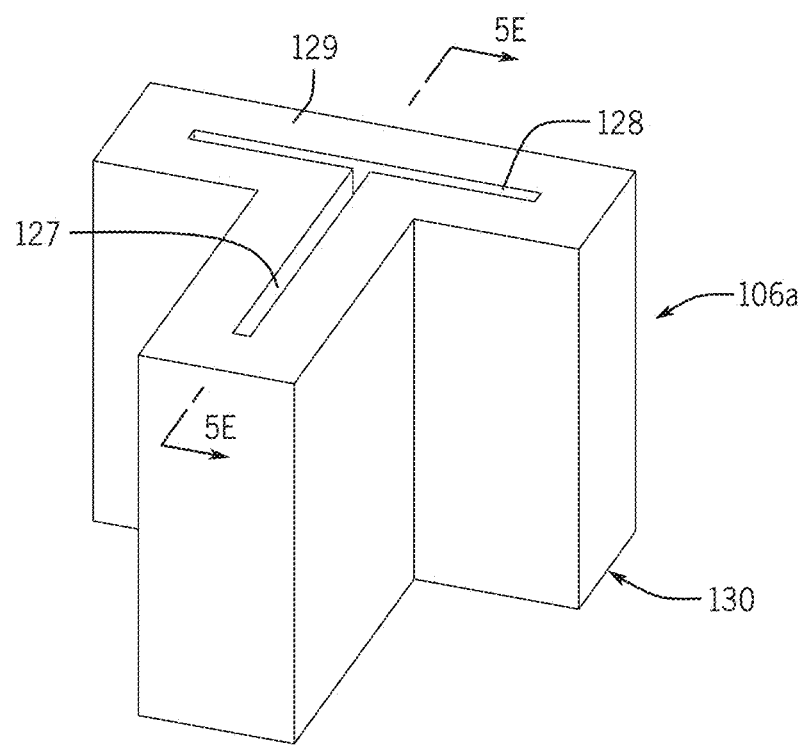
FIG. 5D is an isometric view of an interior support feature of an energy collector according to various embodiments.
Figure 5E:
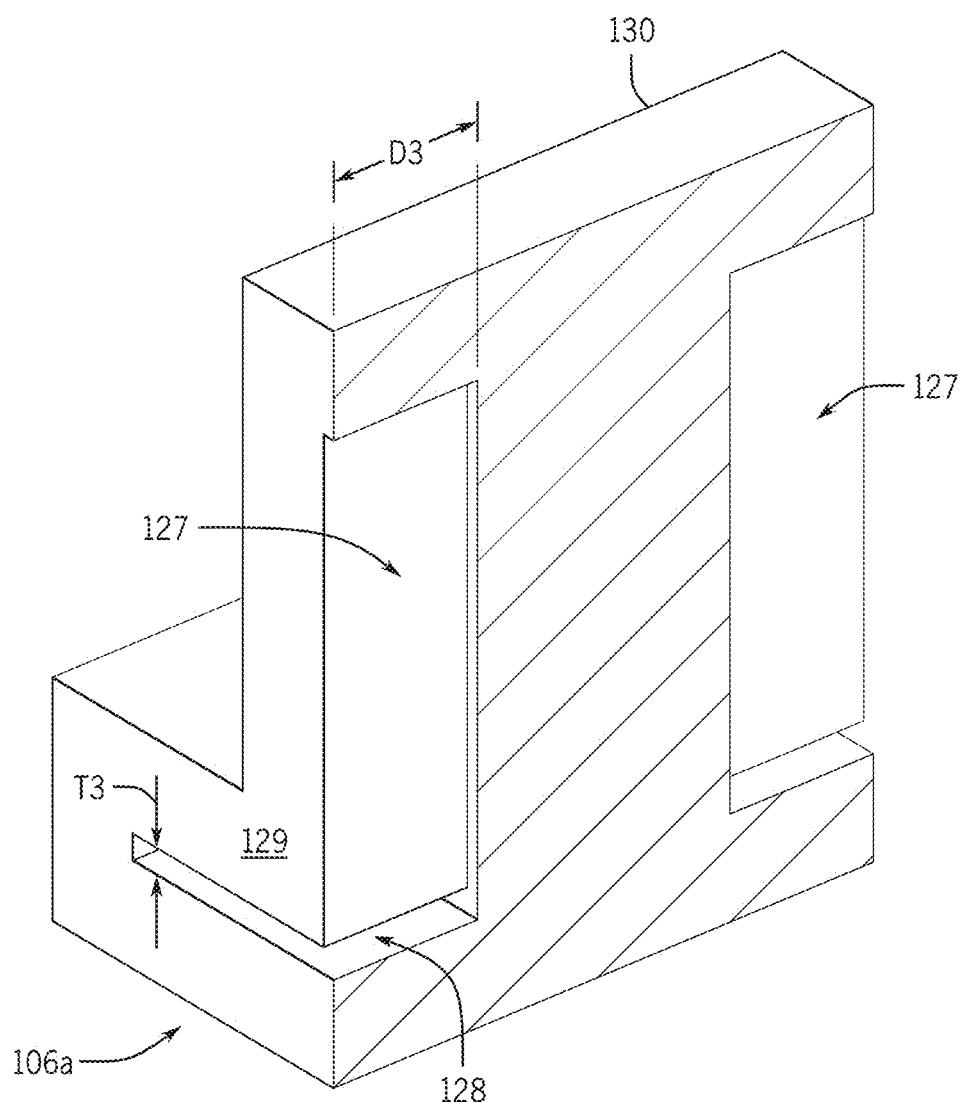
FIG. 5E is a detailed view of a cross section of the interior support feature of FIG. 5D taken along section line 5E-5E.

With reference to FIGS. 5D and 5E, the interior support feature 106a has a structure similar to the edge support feature 106b; however, in the depicted embodiment, the interior support feature 106a does not have the step feature 125. Instead, the interior support feature 106a forms a T-shape with alignment recesses 127 and 128 defined therein. As shown in FIG. 5E, the alignment recesses 127 and 128 have a depth D3 and thickness T3.

The edge support features 106b and interior support features 106a support a first heat retaining member 110 and a second heat retaining member 111 that together form an absorber 117 that absorbs solar radiation. The absorber 117 has one or more alignment protrusions 108 positioned on a bottom surface 178 that mate with corresponding alignment recesses 123, 124, 127, 128 in the edge or interior support features 106a,b to align the absorber 117 with the base 105. FIG. 5C shows an alignment protrusion 108, which forms a T-shape. The alignment protrusion 108 has a depth D2 and a thickness T2, which cooperates with alignment recess 123, 124, 127, and 128. The alignment recess 123, 124 and 127, 128 have corresponding shapes to alignment protrusion 108, such that the parts mate loosely and provide alignment of the absorber 117 and the base 105.

The relationship between the depth D1 of the alignment recess 123 and 124 of the edge support feature 106b and the depth D2 of the alignment protrusion 108 is such that D1 is greater than D2. Similarly, the relationship between the depth D3 of alignment recess 127 and 128 of the interior support feature 106a and the depth D2 of the alignment protrusion 108 is such that D3 is greater than D2. Further, the thickness T1 of alignment recess 123 and 124 is greater than the thickness T2 of the alignment protrusion 108, and the thickness T3 of the alignment recess 127 and 128 is greater than the thickness T2 of the alignment protrusion 108. In this way, a thermal conductivity path between the absorber 117, through the alignment protrusion 108, to the edge support feature 106b or the interior support feature 106a, to the base 105, and to the ambient environment is broken. Additionally, the step feature 125 and the recessed face 126 of the edge support feature 106b also serve to break the thermal conduction path from the absorber 117 through the base 105 to the ambient environment. Thus, the support features 106 align the absorber 117 to the base 105, while acting as thermal insulators to prevent or reduce heat transfer between the absorber 117 and the base 105.

In an alternate embodiment, the support features 106 may be omitted and the absorber 117 may be magnetically suspended within the energy collector 100. For example, magnets may be mounted to the absorber 117 with the south pole facing down. Other magnets, possibly of different strength from the magnets on the absorber 117, may be mounted to the base 105 of the energy collector 100 with the south pole facing up. Because similar magnetic poles repel one another, the magnets on the absorber 117 and the base 105 repel one another, suspending the absorber 117 above the base 105 with no physical connection between them. By magnetically suspending the absorber 117, physical contacts with the rest of the energy collector 100 are minimized, thus minimizing heat conduction paths to the surrounding environment and heat loss. Thus, efficiency of the energy collector 100 is maximized.

The Absorber

Figure 6B:
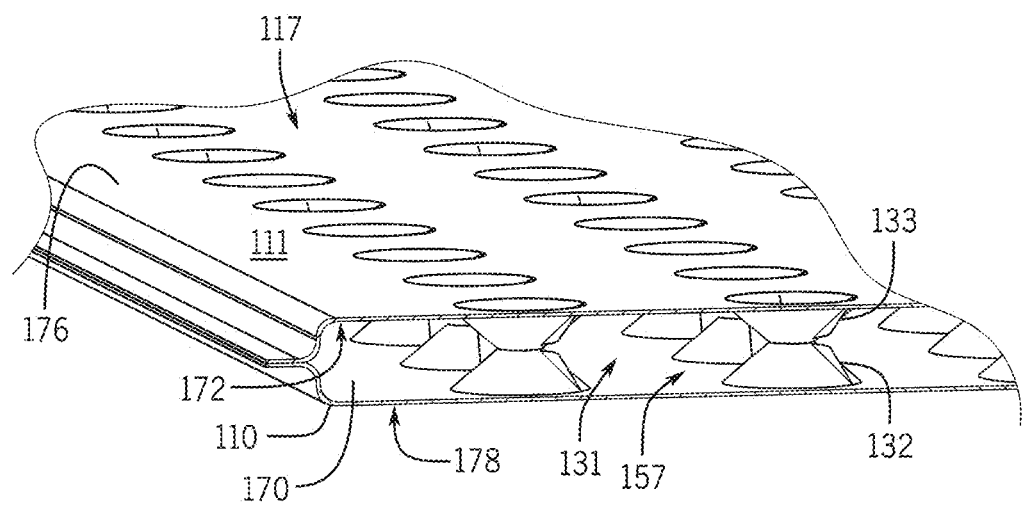
FIG. 6B is a detailed partial view of a cross section of the absorber of FIG. 6A taken along section line 6B-6B.

The absorber 117 absorbs and retains radiant energy. FIG. 6A illustrates an isometric view of the energy collector 100 of FIG. 1 with the cover 113 removed, exposing the absorber 117. FIG. 6B shows a detailed view of the absorber 117 of FIG. 6A through section line 6B-6B. The absorber 117 may include a first heat retaining member 110 and a second heat retaining member 111 that may be operably coupled together to define a fluid cavity 131 therebetween. In some embodiments, the first heat retaining member 110 and the second heat retaining member 111 may be formed of separate plates that are coupled together to define the fluid cavity 131. In other embodiments, the heat retaining members 110, 111 may be integrally formed together but with the fluid cavity 131 defined therein.

Figure 6C:
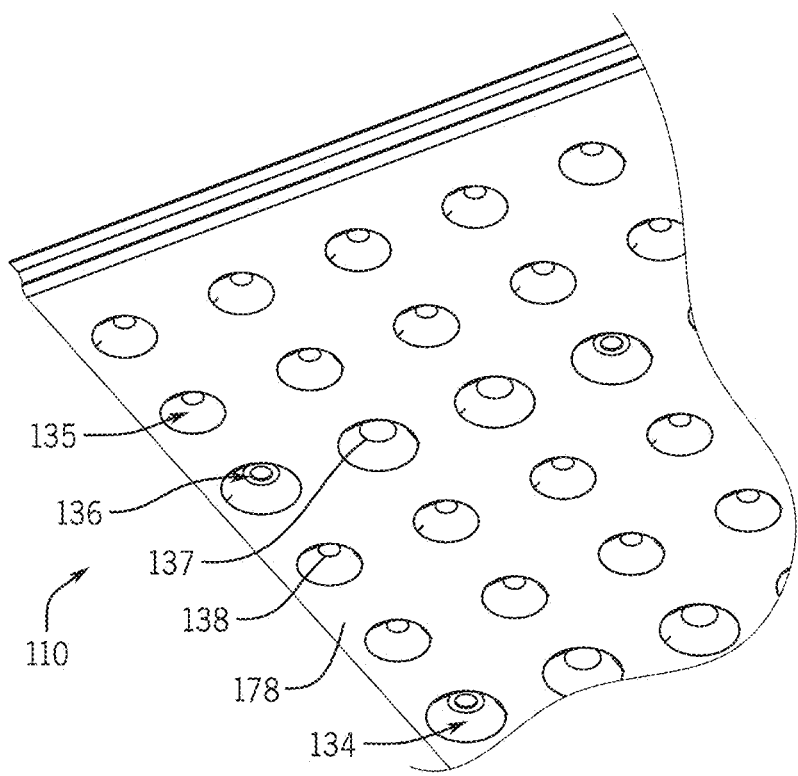
FIG. 6C is a partial isometric view of a first heat retaining member of the absorber of FIG. 6A.
Figure 6D:
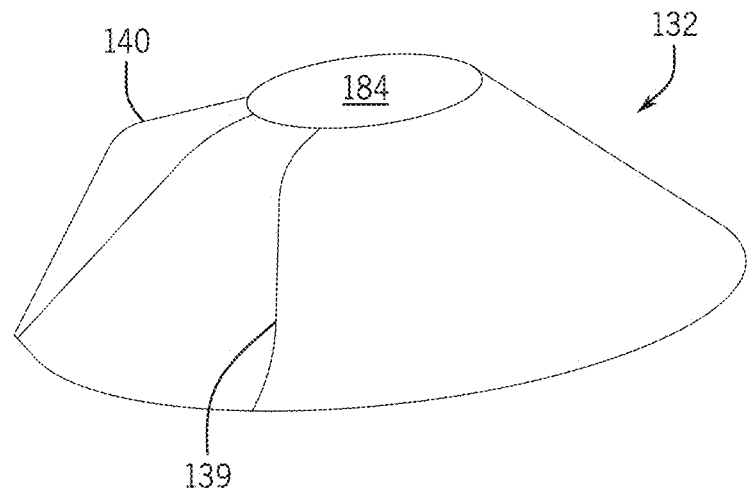
FIG. 6D is an isometric detailed view of a dimple of a lower or second heat retaining member of an absorber of an energy collector according to various embodiments.
Figure 6E:
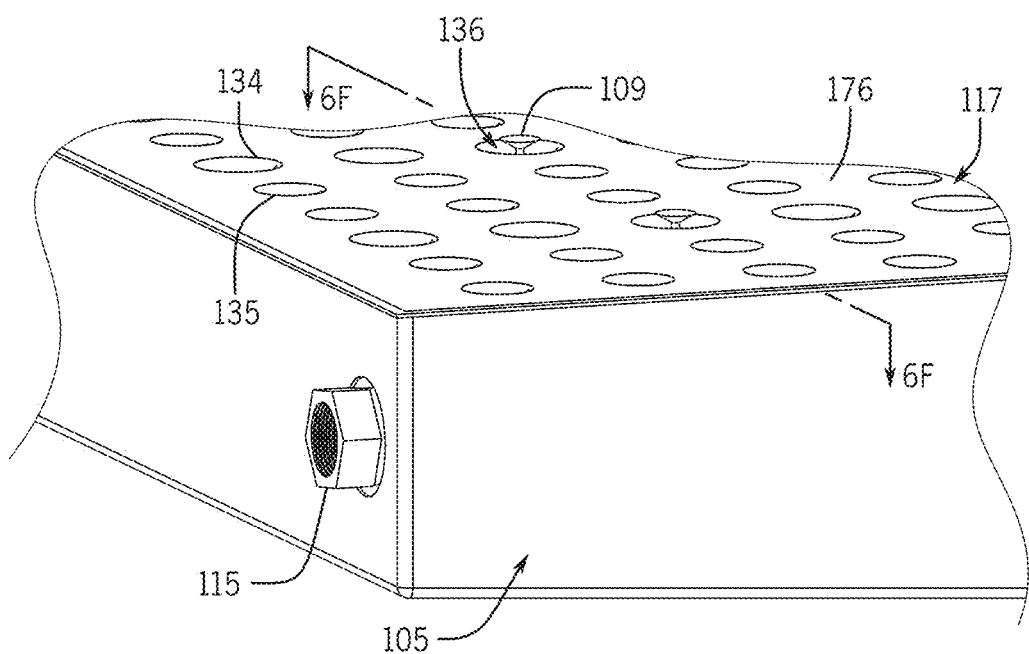
FIG. 6E is a partially deconstructed detailed view of an energy collector according to various embodiments.

In the example shown in FIGS. 6B and 6C, the heat retaining members 110, 111 may include one or more retaining elements 132, 133 that assist in coupling the two heat retaining members 110, 111 together, while defining a separation distance therebetween to define the fluid cavity 131. In one embodiment, the retaining elements 132, 133 are a plurality of first dimples 132 formed on an inner surface 170 of the first heat retaining member 110 and a plurality of second dimples 133 formed on an inner surface 172 of the second heat retaining member 111. In the example shown in FIG. 6B, the retaining elements 132, 133 may have a generally cone-like shape, tapering away from the respective surface 170, 172 of the respective heat retaining member 110, 111. FIG. 6D illustrates a detailed view of a single retaining element 132 of the first heat retaining member 110. The retaining element 132 has a generally cone-like shape with a planar face 184. The retaining element 132 may be formed with extended surfaces 139 and 140, which increase the overall surface area of the absorber 117. The retaining element 133 of the second heat retaining member 111 may have similar features.

FIG. 6C shows a detailed view of an outer surface 178 of the first heat retaining member 110 (i.e., the bottom surface 178 of the absorber 117). The outer or bottom surface 178 has one or more connective retaining features 134 and one or more retaining cavities 135 that correspond to the plurality of first dimples 132 on the inner surface 170. The one or more connective retaining features 134 and one or more retaining cavities 135 may form cavities within the plurality of first dimples 132. The connective retaining features 134 and the retaining cavities 135 both have planar faces 137, 138, respectively, that correspond to the planar faces 184 of the plurality of first dimples 132. The connective retaining features 134 and planar faces 137 are sized to accommodate one or more heat retaining member apertures 136. The heat retaining member apertures 136 may be spaced at regular or irregular intervals within the connective retaining features 134 and sized to accommodate force distribution pillars 109 that pass loosely through the heat retaining member apertures 136. An outer surface 176 of the second heat retaining member 111 (i.e., the top surface 176 of the absorber 117) has similar corresponding features.

Figure 8A:
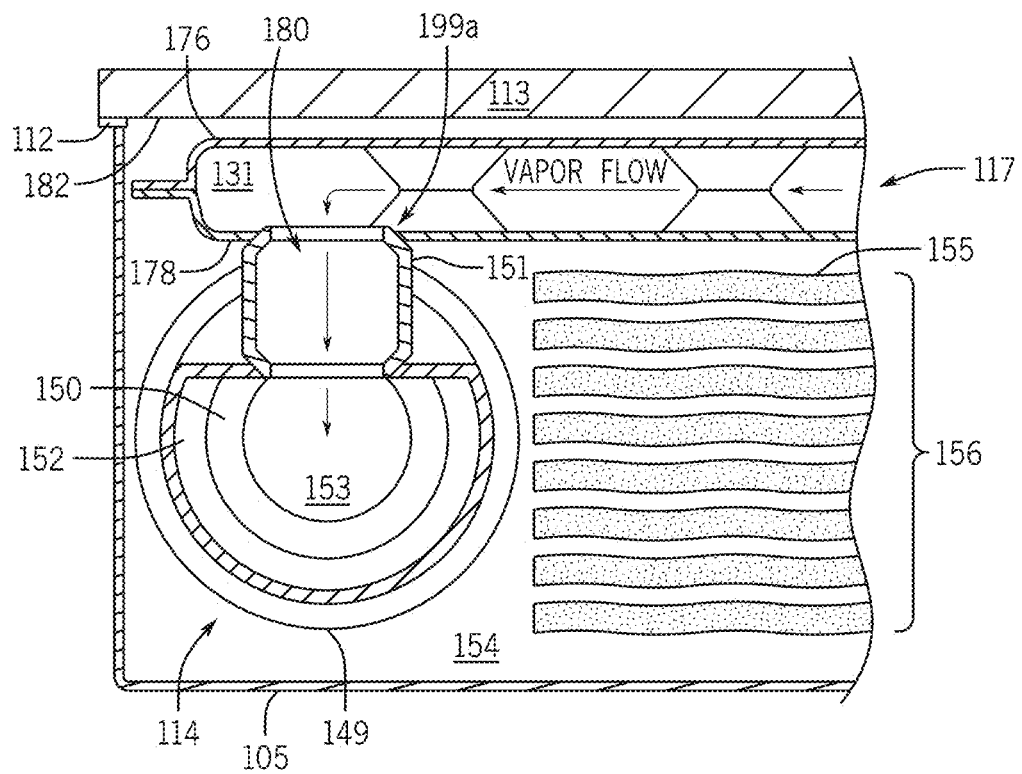
FIG. 8A is a partial view of a cross section of the energy collector of FIG. 6A taken along section line 8A-8A showing part of a vapor outlet manifold.
Figure 8B:
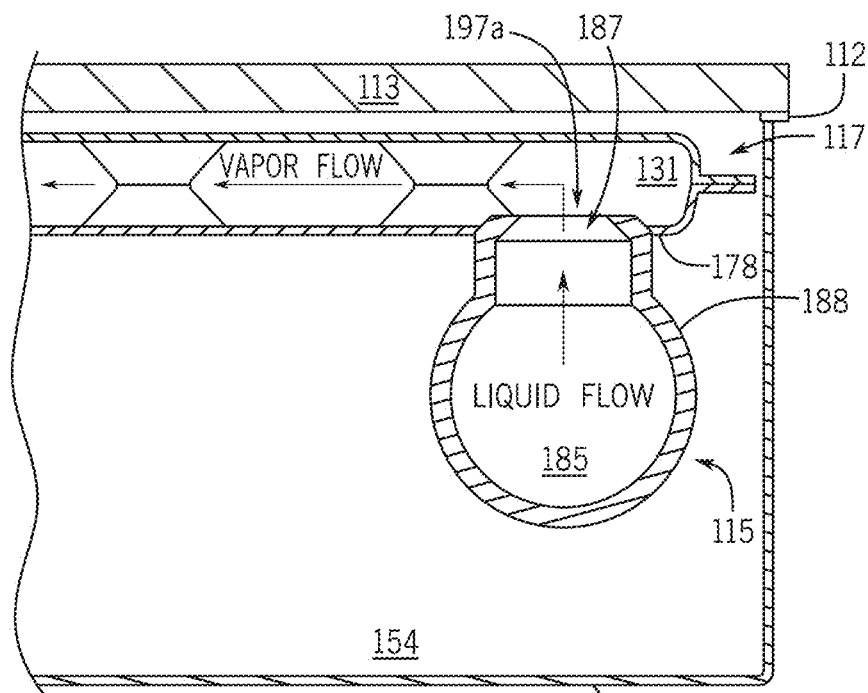
FIG. 8B is a partial view of a cross section of the energy collector of FIG. 6A taken along section line 8B-8B showing part of a liquid inlet manifold.

As shown in FIGS. 2, 8A, and 8B, the first heat retaining member 110 may also include one or more fluid inlet and outlet apertures. As shown in FIGS. 2 and 3, an edge portion of the first heat retaining member 110 positioned adjacent to the wall 119 and to liquid inlet ports 101 of the base 105 defines two liquid inlet apertures 197a and 197b. As shown in FIGS. 3 and 8A, an edge portion of the first heat retaining member 110 positioned adjacent to the wall 121 and to vapor outlet ports 102 of the base 105 defines two vapor outlet apertures 199a and 199b. While two liquid inlet apertures 197a,b and two vapor outlet apertures 199a,b are depicted in the present embodiment, any number of liquid inlet apertures and vapor outlet apertures are contemplated, depending on the desired flow through the energy collector 100.

The absorber 117 is assembled by aligning the first heat retaining member 110 and second heat retaining member 111 such that the plurality of first dimples 132 and the plurality of second dimples 133 align, which in turn aligns corresponding connective retaining features 134, retaining cavities 135, and heat retaining member apertures 136. The first and second dimples 132, 133 are aligned such that the planar faces 184 are in contact. This alignment of dimples 132, 133 provides structural support to the absorber 117 and creates a space or gap between the remaining surfaces of the first and second heat retaining members 110, 111, forming the fluid cavity 131 therebetween. The fluid cavity 131 may house a working fluid 157, which will be discussed in more detail below.

The multitude of passages created by the plurality of first dimples 132 and plurality of second dimples 133 enables the absorber 117 to have a high flow area (e.g., across a substantial area of the interior surface of the heat retaining members), and thus a low pressure drop, less than approximately 100 Pascal, of any fluid passing therebetween. In some embodiments, the space between the inner surface 170 of the first heat retaining member 110 and the inner surface 172 of the second heating retaining member 111 is greater than the size of the vapor bubbles formed in the working fluid 157 during phase change.

The heat retaining members 110, 111 may be panels that allow for the maximum possible contact area between the absorber 117 and the working fluid 157 contained within the fluid cavity 131. In the embodiment where the first and second dimples 132, 133 of the respective first and second heat retaining members 110, 111 include extended surfaces 139, 140, the extended surfaces 139, 140 may increase the contact area of the absorber 117 with the working fluid 157, enabling the absorber 117 to exchange more energy with the working fluid 157 and therefore absorb more radiation energy than it would be able to absorb without the extended surfaces 139 and 140. By providing intimate contact between the absorber 117 and the working fluid 157, the need for expensive materials with a high thermal conductivity, such as copper, silver, gold, platinum or their alloys, is avoided. Instead, the use of low cost materials, such as steel, iron, aluminum, or alloys thereof, is enabled.

The first heat retaining member 110 and the second heat retaining member 111 may be manufactured by stamping, forging, or pressing processes. After the first and second heat retaining members 110, 111 are aligned, as discussed above, the components may be joined together through any appropriate means, such as, for example, welding, soldering, brazing, or the use of adhesives. In one example, the first heat retaining member 110 and the second heat retaining member 111 may be manufactured by welding, for example, without limitation with a laser, as substantially flat sheets of any acceptable thickness to form planar faces 137 and 138. Then, a pressure high enough to permanently deform the first and second heat retaining members 110, 111 may be applied between them, causing a plurality of connective retaining features 134 and retaining cavities 135 to form. In another example, the heat retaining member apertures 136 may be formed at the same time and by the same laser used to weld the planar faces 137 and 138. It is contemplated that any laser welding may be completed on the side opposite any coating that may have been applied to the flat sheets, in order to avoid damaging the coating. The flat sheets may be any material that is suitable for bonding, using methods such as, for example, laser welding.

In one embodiment, an assembled absorber 117 of the present disclosure may have a coating with selective emissivity £, to certain wavelengths of radiation. The coating may absorb certain wavelengths of radiation, transmit other wavelengths, and reflect still others. The coating may be applied, for example, by direct vapor deposition, chemical vapor deposition, magnetron sputtering vapor deposition, or other suitable deposition methods. In some embodiments, the coating may be applied after the absorber 117 is assembled. In other embodiments, the coating may be applied to the raw stock from which the first heat retaining member 110 and the second heat retaining member 111 of absorber 117 are made.

In an embodiment in which the absorber 117 does not have a coating, the energy collector 100 may have a radiation penetrable cover 113 transparent to infrared wavelengths of radiation, but opaque to solar spectrum radiation. For example, the radiation penetrable cover 113 may be transparent to radiation wavelengths of 5 to 10 microns in length, but opaque to radiation in the range of 300 to 1700 nanometers in length.

The Radiation Penetrable Cover and Seal

With reference to FIG. 2, the energy collector 100 may be sealed on one face with a radiation penetrable cover 113. The radiation penetrable cover 113 may be a flat rectangular panel. In one embodiment, the base 105 walls 119, 120, 121, and 122 may each include a top edge surface that can support the radiation penetrable cover 113 and/or seal 112 above the absorber 117. The base 105 combined with the radiation penetrable cover 113 and seal 112 forms a base manifold 154 that may be evacuated of gas and kept at a low vacuum. The pressure inside the base manifold 154 may be maintained such that the mean free path of gas molecules within the collector 100 is longer than the distance between the absorber 117 top surface 176 and the radiation penetrable cover 113 bottom surface 182. As one example, the pressure may be between 0.1 and 100 Pascal. Maintaining a lower pressure insulates the absorber 117 from the ambient environment, reducing heat loss and increasing the overall efficiency of the energy collector 100.

The radiation penetrable cover 113 may be made of any suitable material that transmits solar radiation, such as, for example, glass, quartz, polycarbonate, acrylic, or any other suitable material. As one example, the cover may be made of 6 mm tempered glass. The remaining walls of the energy collector 100 may be made of, preferably by not exclusively, a metal. Depending on the radiation wavelength, the radiation penetrable cover 113 may transmit, reflect, or absorb the radiation. The radiation penetrable cover 113 may have coatings, surface modifications, or bulk material properties that give it different transmission, reflection, and absorption properties with respect to different wavelengths of radiation on different faces and in different directions. In the example where the absorber 117 of the energy collector 100 has no coating, the radiation penetrable cover 113 may be transparent to infrared wavelengths of radiation. For example, the radiation penetrable cover 113 may be transparent to radiation wavelengths of 5 to 10 microns in length.

The seal 112 may be formed around the circumference of the energy collector 100 in order to provide a seal between dis-similar materials of the radiation penetrable cover 113 and the base 105. In one example, the seal 112 between the radiation penetrable cover 113 and the base 105 may be made by ultrasonic soldering. The seal 112 is both structurally strong and impervious to vacuum leaks. The seal may also be made of fluorocarbons, for example, the seal may be a fluor elastomer seal.

The Force Distribution Pillars

Figure 7B:
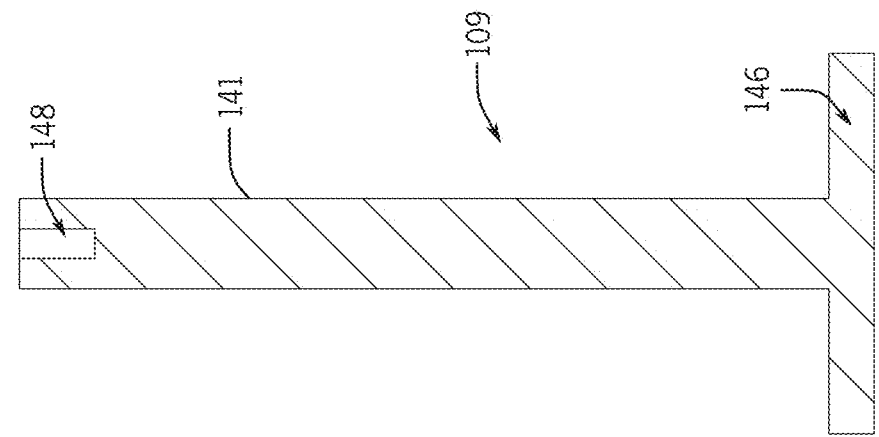
FIG. 7B is a cross section view of the force distribution pillar of FIG. 7A taken along section line 7B-7B.
Figure 7A:
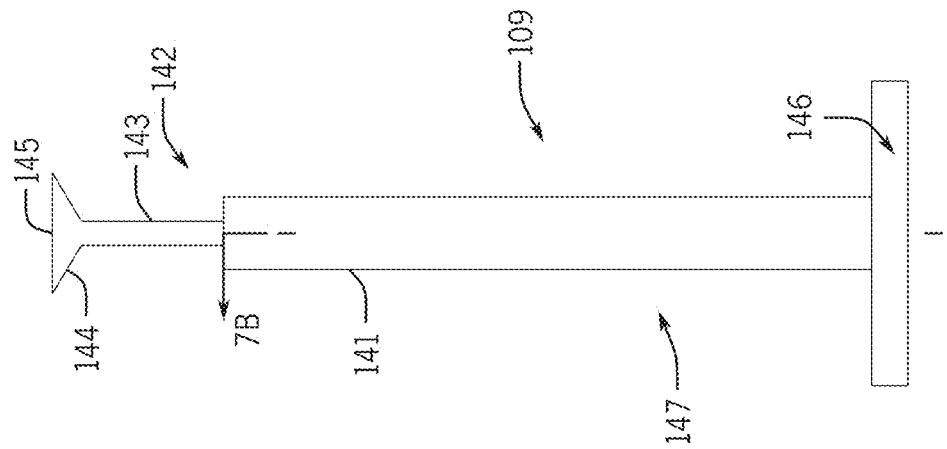
FIG. 7A is a side elevation view of a force distribution pillar according to various embodiments.

The force generated on the radiation penetrable cover 113 when the sealed assembly is under vacuum—for example in the range of between 0.1 and 100 Pascal—may be up to 203,000 Newtons (approximately 46,000 pounds force) on a 2 square meter energy collector 100. To support the cover under such conditions, the energy collector 100 may include one or more force distribution pillars 109, which act to spread out the compressive forces of the vacuum across the area of the radiation penetrable cover 113. FIGS. 7A and 7B show detailed side elevation and cross section views of one of the force distribution pillars 109 of FIG. 2. FIG. 7A shows an assembled force distribution pillar 109. FIG. 7B shows a cross section of the force distribution pillar 109 of FIG. 7A taken along line 7B-7B. The force distribution pillar 109 has a body 147 and a detachable head 142. The body 147 includes a foot 146 and a shaft 141. The shaft 141 includes a blind hole 148 at its upper end. The detachable head 142 has a neck 143, a flare 144, and a support face 145. The blind hole 148 of the shaft 141 is adapted to securely receive the neck 143 of the detachable head 142, as shown assembled in FIG. 7A. The two-piece construction of the force distribution pillar 109 facilitates assembly of the energy collector 100. For example, the detachable head 142 may be assembled into the shaft 141 after the absorber 117 is installed.

Figure 6F:
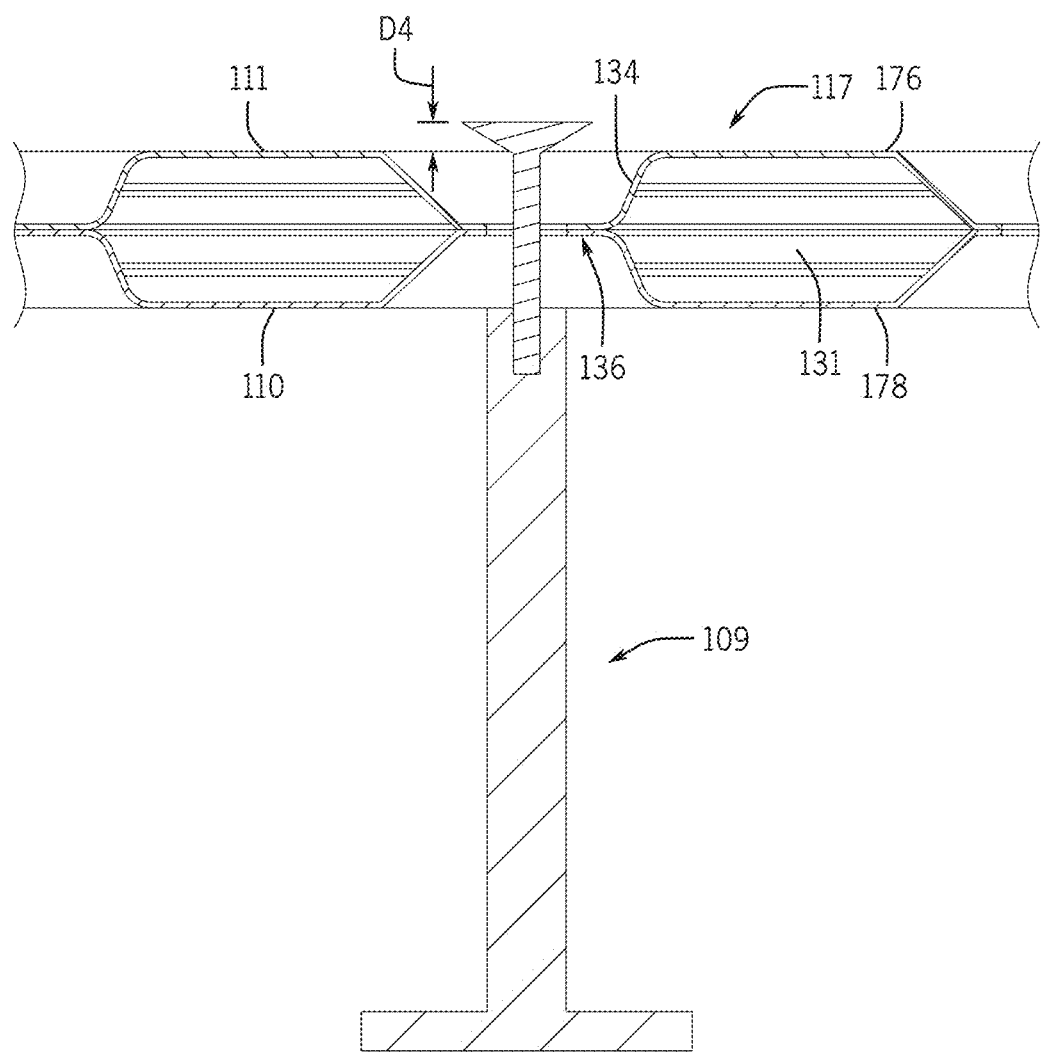
FIG. 6F is a partial view of a cross section of an absorber and force distribution pillar of the energy collector of FIG. 6E taken along section line 6F-6F.
Figure 7C:
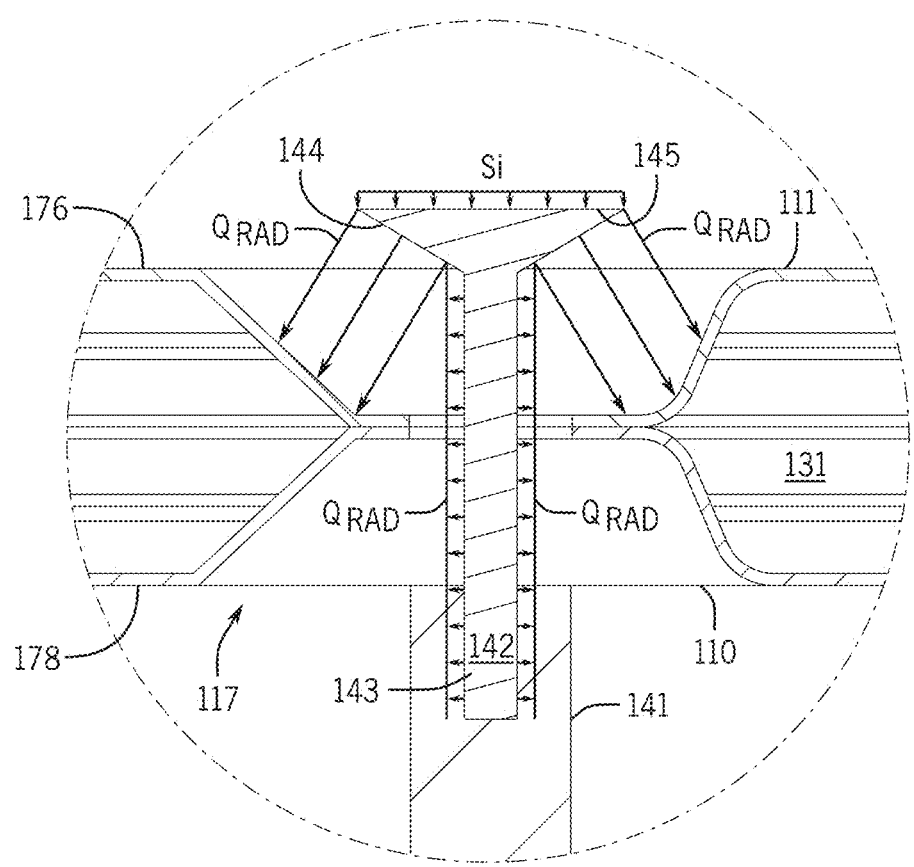
FIG. 7C is a partial view of a cross section of an absorber and force distribution pillar of the energy collector of FIG. 6E taken along section line 6F-6F.

With respect to FIGS. 2, 6F, and 7C, when arranged in the energy collector 100, the force distribution pillars 109 may be mounted to the base 105, pass through the absorber 117, and support the radiation penetrable cover 113. The foot 146 may seat on top of the base 105. The neck 143 may pass through the aligned heat retaining member apertures 136 defined within the connective retaining features 134 of the first and second heat retaining members 110, 111 of the absorber 117. The heat retaining member apertures 136 may be sufficiently wide to ensure that the force distribution pillars 109 do not contact the absorber 117 to prevent heat transfer losses therethrough. As shown in FIG. 6F, a force distribution pillar 109 protrudes through a heat retaining member aperture 136 a distance D4 above the top outer surface 176 of the second heat retaining member 111 to provide support to the radiation penetrable cover 113 (FIG. 2). Distance D4 is sufficiently large to allow the radiation penetrable cover 113 to deform under vacuum, but not touch the absorber 117. The support face 145 of the force distribution pillar head 142 may contact a lower surface of the radiation penetrable cover 113. In this manner, the force distribution pillar 109 is in contact with both the base 105 and the radiation penetrable cover 113. The foot 146 stabilizes the force distribution pillar 109 and spreads any compression forces due to the vacuum environment onto the base 105. Similarly, the support face 145 of the force distribution pillar head 142 spreads any compression forces onto a wider area of the radiation penetrable cover 113.

The neck 143 of the pillar head 142 may serve several purposes. For example, the neck 143 may transmit any compressive forces (e.g., the forces generated by the radiation penetrable cover 113 under a vacuum) from the support face 145 to the shaft 141. The neck 143, being of a smaller cross-sectional area than the shaft 141, limits heat flux transmitted along its length. An equation for one-dimensional steady state heat conduction along a cylindrical shaft is shown in equation 2.

$$\dot{Q}_{cond} = kA \frac{T_1 - T_2}{L} \quad (2)$$

In equation 2, $\dot{Q}_{cond}$ represents the rate of conductive heat transfer along a shaft; k represents thermal conductivity of the shaft material; A represents the cross-sectional area of the shaft; the temperatures at opposite ends of the shaft are T1 and T2, respectively; and L is the length of the shaft. The smaller the cross sectional area (A) of the neck 143, the less heat is transmitted ($\dot{Q}_{cond}$). Any heat that is transmitted along the support head 142, to the shaft 141, foot 146, and ultimately to the base 105, may be lost to the system. Therefore, the smaller the cross sectional area of the neck 143, the less heat is lost. Additionally, a smaller neck 143, enables a smaller heat retaining member aperture 136, and a smaller connective retaining feature 134 (FIG. 6C), allowing for greater absorber 117 surface area.

With reference to FIGS. 7A and 7C, the support face 145 receives a fraction of the radiation incident on the energy collector 100. In prior art devices, nearly all of this fraction of radiation would be lost. However, in the energy collector 100 of FIG. 2, the flare 144 and neck 143 of the pillar head 142, and the top outer surface of the connective retaining feature 134 of the second heat retaining member 111 are configured to reclaim some of that lost energy through radiation heat transfer from the pillar head 142 to the second heat retaining member 111. Equation 3 shows the relation for the rate of radiation heat transfer, $\dot{Q}_{rad}$, between two bodies having temperatures T, emissivities ε, areas A, and a respective view factor from body 1 to body 2, $F_{12}$. The Stefan-Boltzmann constant is represented by σ.

$$\dot{Q}_{rad} = A_1 \sigma (T_1^4 - T_2^4) \left[ \frac{1 - \varepsilon_1}{\varepsilon_1} + \frac{A_1 - A_2 - 2A_1 F_{12}}{A_2 - A_1 F_{12}^2} + \left[ \frac{1 - \varepsilon_2}{\varepsilon_2} \right] \frac{A_1}{A_2} \right]^{-1} \quad (3)$$

With continued reference to FIGS. 7A and 7C, radiation incident on the support face 145 of pillar 109 will cause it to heat. The restriction of conductive heat transfer along the neck 143, as described previously, enhances that heating. The flare 144 and the neck 143 have surfaces that are exposed to mating surfaces on the absorber 117. As the flare 144 and neck 143 heat up, they radiate heat into the absorber 117, according to the relation in equation 3. The heat then conducts through the walls of the absorber 117 and into the working fluid 157 in the fluid cavity 131. Thus, radiation incident on the force distribution pillars 109 that would normally be lost, is reclaimed, improving overall energy collector efficiency. The emissivities ε of the flare 144, neck 143, and absorber 117 may be modified by the application of one or more coatings that may provide greater emissivity with respect to some wavelengths of radiation and lower emissivity with respect to others.

In one embodiment, a sealing compound may be disposed between the support face 145 of the pillar heads 142 and the radiation penetrable cover 113. The sealing compound may accommodate for variations in the height of the pillar heads 142 relative to the radiation penetrable cover 113 caused by manufacturing tolerances in the radiation penetrable cover 113, base 105, and the force distribution pillars 109. The sealing compound thus may allow for more variation in manufacturing tolerances, reducing costs, while ensuring uniform contact and support between the force distribution pillar heads 142 and the radiation penetrable cover 113. In one embodiment, the sealing compound may be epoxy, or epoxy/fiber composite that permanently bonds the radiation penetrable cover 113 to the pillar heads 142 as it accommodates pillar height variations, and thus gaps between the pillar heads 142 and the radiation penetrable cover 113.

Insulation Layer

In one embodiment, as shown in FIG. 8A, the energy collector 100 may include insulation material 155 disposed in all or a part of the base manifold 154 in order to further reduce heat losses. The insulation material 155 may be in the form of multilayer insulation 156. The insulation material 155 may be any material with low thermal conductivity, such as, for example, fiberglass, mineral wool, cellulose, polyurethane, polystyrene, and the like. In some embodiments, the multilayer insulation may be coated on one or more sides with a coating that is highly reflective of thermal radiation. For example, the reflective coating may include paint, films, or any other coating that has characteristics that reflect thermal radiation.

The Working Fluid

The working fluid 157 is contained within the fluid cavity 131 of the absorber 117. The working fluid 157 may circulate through the absorber 117 to a vapor outlet manifold 114 to an end use, energy storage, or another energy collector 100 to liquid inlet manifolds 115, 116 and back into the absorber 117. In this manner, the working fluid 157 may receive energy from the absorber 117, transport energy to an end use, energy storage, or another energy collector 100, and recycle back to the absorber 117 for use again as an energy transport.

The working fluid 157 may be any fluid that is capable of experiencing a gas to liquid or liquid to gas phase change at temperatures and pressures experienced in the absorber 117 of the energy collector 100. In some embodiments, the absorber 117 operates between −60° C. and +120° C. In other embodiments, the absorber operates at 400° C. above the ambient temperature. In some embodiments, the absorber 117 operates at pressures up to 10 bar. In other embodiments, the absorber 117 operates at about 70 bar. In some embodiments, the working fluid 157 may be water; solutions of water and alcohols such as propylene glycol, ethylene glycol, methanol, ethanol or other water/alcohol solutions; fluorocarbons; chlorofluorocarbons; hydrochlorofluorocarbons; hydrocarbons, such as, for example, propane, butane, pentane, toluene, or isobutene; sulfur dioxide; helium; hydrogen; carbon dioxide; nitrogen; or the like.

The Fluid Manifolds

With respect to FIGS. 2, 8A, and 8B, the vapor outlet manifold 114 and liquid inlet manifolds 115 and 116 of the energy collector 100 will now be discussed in more detail. As shown in FIG. 2, the vapor outlet manifold 114 may be a generally cylindrical elongate feature with threading on at least one end. However, the threading may be omitted and the vapor outlet manifold 114 may be coupled to the energy collector 100 by various means, such as, for example, by welding, soldering, brazing, adhesion, and the like. The vapor outlet manifold 114 defines a vapor conduit 153 and defines two vapor outlet apertures 181 at either end. As shown in FIGS. 2 and 8A, the vapor outlet manifold 114 may include one or more vapor receiving apertures 180 on its outer surface.

With continued reference to FIG. 8A, the vapor outlet manifold 114 may have an outer shell 149 and an inner shell 150, that together form an annular vacuum jacket 152 that insulates the vapor conduit 153. The vapor receiving aperture 180 may be positioned directly within the outer shell 149, the inner shell 150, and/or within a manifold protrusion 151. The manifold protrusion 151 may extend from an outer surface of the vapor outlet manifold 114 and may have a generally rectangular or cylindrical shape. The manifold protrusion 151 may be an integral component of the vapor outlet manifold 114 or it may be a separate component that is coupled to the vapor outlet manifold 114.

In one embodiment, the annular vacuum jacket 152 is in fluid communication with the base manifold 154. The annular vacuum jacket 152 may also be in fluid communication with the vacuum pump 198 to reduce pressure therein. The annular vacuum jacket 152 is maintained at a pressure such that the mean free path of gas molecules within the collector is longer than the distance between the outer surface of the inner shell 150 and the inner surface of the outer shell 149. As one example, the pressure may be between 0.1 and 100 Pascal. By maintaining a low pressure, the annular vacuum jacket 152 insulates the vapor in the vapor conduit 153, reducing heat loss to the ambient environment and maximizing energy collector 100 efficiency.

As shown in FIGS. 2 and 8B, the first liquid inlet manifold 115 may have an elongate and generally cylindrical body 186 with a generally spherical first end 188 and a flared cone-like second end 190. The body 186 may be substantially threaded and may define a liquid conduit 185 therethrough. The cone-like second end 190 defines a liquid inlet aperture 189. The first spherical end 188 defines a liquid outlet aperture 187 that is generally perpendicular to the liquid inlet aperture 189. The second liquid inlet manifold 116 has generally the same shape as the first liquid inlet manifold 115 with a generally cylindrical body 192 defining a liquid conduit (not shown), a generally spherical first end 194 defining a liquid outlet aperture 193, and a flared cone-like second end 196 defining a liquid inlet aperture 191. However, the second liquid inlet manifold 116 may be generally smaller in size than the first liquid inlet manifold 115 and its body 192 may not be threaded.

The vapor outlet manifold 114 and liquid inlet manifolds 115, 116 may be shaped and sized to reduce pressure changes as the working fluid 157 flows therethrough. For example, the vapor outlet manifold 114 and liquid inlet manifolds 115, 116 may each have a sufficiently large diameter to reduce pressure drop losses. By reducing pressure drop losses in the vapor outlet manifold 114 and the liquid inlet manifolds 115 and 116, pressure differentials are minimized. By reducing pressure differentials, and operating under a vapor dome (i.e., where liquid and vapor coexist), temperature of the energy collector 100 relative to the ambient environment is maintained as close as possible.

The respective manifolds 114, 115, and 116 may be made of convoluted stainless steel tube (CSST), convoluted steel tube (CST), or the like.

When positioned within the energy collector 100, the liquid inlet manifolds 115, 116 may be positioned on a side opposite the vapor outlet manifold 114. For example, the liquid inlet manifolds 115, 116 may be positioned adjacent to wall 119 of the base 105, while the vapor outlet manifold 114 may be positioned adjacent to the opposite wall 121 of the base 105 and may extend continuously along the length of the wall 121. The liquid inlet manifolds 115 and 116 may be positioned on opposite ends of the base. For example, the liquid inlet manifold 115 may be adjacent to wall 122 of the base 105, while the liquid inlet manifold 116 may be adjacent to wall 120 of the base 105. The liquid inlet apertures 189, 191 of each respective liquid inlet manifold 115, 116 align with the liquid inlet ports 101 of the base 105, while the two vapor outlet apertures 181 of the vapor outlet manifold 114 align with the vapor outlet ports 102 of the base 105. As shown in FIGS. 2, 8A and 8B, the liquid inlet manifolds 115, 116 and the vapor outlet manifold 114 may be positioned below the absorber 117, such that the liquid outlet apertures 187, 193 of the liquid inlet manifolds 115, 116 align with the liquid inlet apertures 197a and 197b, respectively, of the absorber 117, and the vapor receiving apertures 180 align with the vapor outlet apertures 199a and 199b (not shown) of the absorber 117. In this manner, the vapor outlet manifold 114 and liquid inlet manifolds 115, 116 are in fluid communication with the absorber 117. The manifold protrusions 151, defining the vapor receiving apertures 180, may extend through the vapor outlet apertures 199a, 199b, such that each manifold protrusion 151 extends slightly into the fluid cavity 131. Similarly, an extension of the first spherical end or collars 188, 194 of each liquid inlet manifold 115, 116, that each define the liquid outlet apertures 187, 193, respectively, may extend through the liquid inlet apertures 197a,b, such that the extensions of the first spherical ends 188, 194 extend slightly into the fluid cavity 131. In this manner, the alignment of the absorber 117 with the liquid inlet manifolds 115, 116 and the vapor outlet manifold 114 creates an air-tight seal, maintaining the vacuum environment throughout the components.

With reference to FIGS. 2 and 8B, working fluid 157 liquid may flow from a source, such as for example, an end use source, energy storage, or another energy collector 100, as mentioned previously, through the liquid inlet port 101 of the base 105 and the liquid inlet aperture 189 of the liquid inlet manifold 115, and into the liquid conduit 185 of the liquid inlet manifold 115. From there, the working fluid 157 liquid may flow out the liquid outlet aperture 187 of the first spherical end 188, through the liquid inlet aperture 197a of the absorber 117, and into the fluid cavity 131 of the absorber 117. Energy stored within the absorber 117 due to absorption of solar radiation may be transferred to the working fluid 157 liquid, resulting in a phase change of the working fluid 157 liquid into working fluid 157 vapor. As shown in FIG. 8A, the working fluid 157 vapor flows through the fluid cavity 131 in the absorber 117, out through the vapor outlet aperture 199a of the absorber 117 and the vapor receiving aperture 180 of the vapor outlet manifold 114, through the manifold protrusion 151, and into the vapor conduit 153. The vapor conduit 153 carries the working fluid 157 vapor from the absorber 117 to a source, such as an end use, energy storage, or another energy collector 100. When the working fluid 157 vapor is used for energy at an end source, the working fluid 157 vapor transfers energy to the end source, resulting in a phase change of the working fluid 157 vapor into working fluid 157 liquid. The working fluid 157 liquid may then be recycled back to the absorber 117, as previously described. When the working fluid 157 vapor condenses, it creates a slight pressure drop, which causes more working fluid 157 vapor to flow to the end source automatically. Thus, it is contemplated that the working fluid 157 may circulate the system automatically. Alternatively, a pump 198 may be used to facilitate the flow of the working fluid 157 throughout the system.

System

Figure 9:
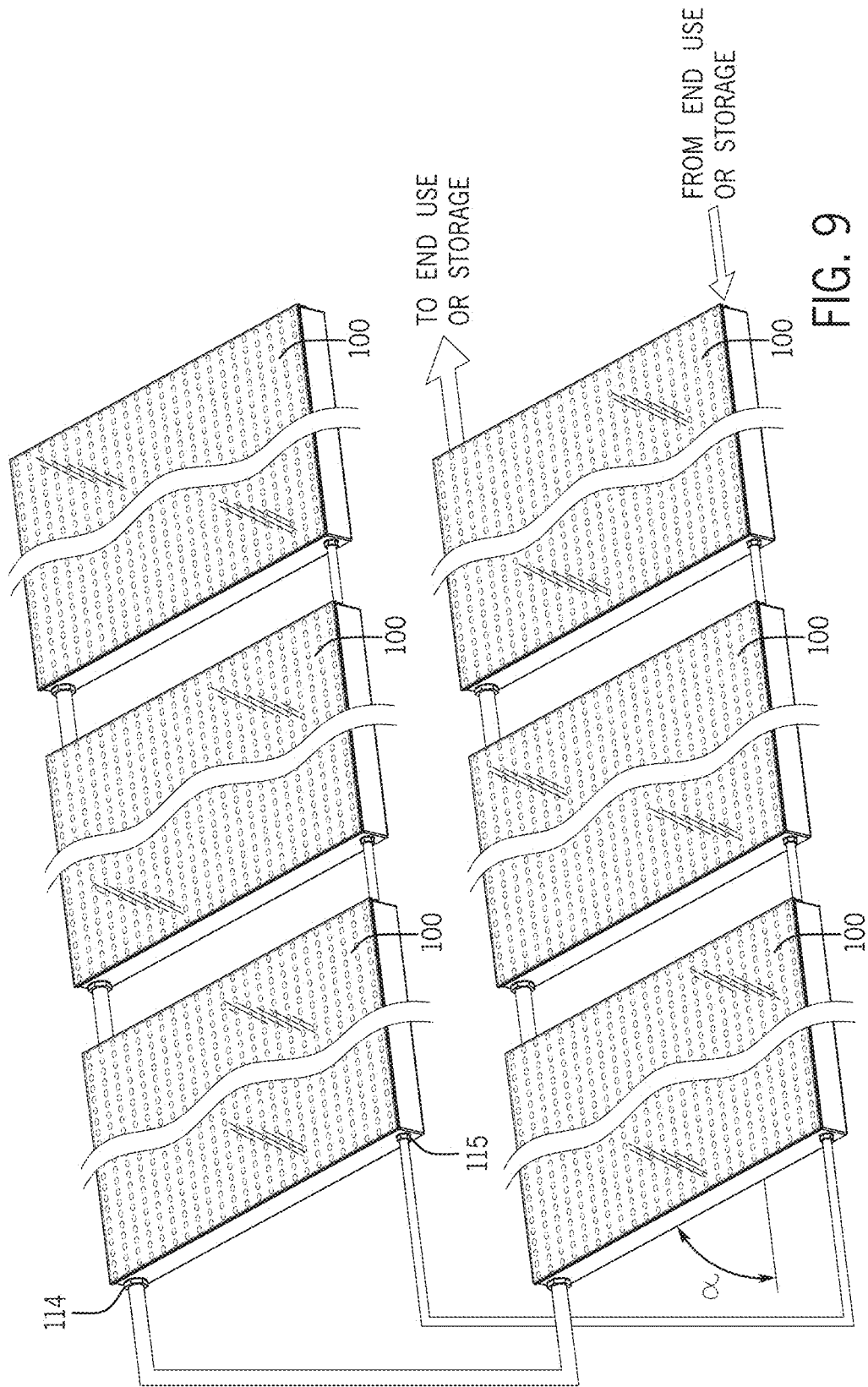
FIG. 9 is a schematic view of a system of energy collectors according to various embodiments.

With reference to FIG. 9, it may be desirable to connect multiple energy collectors 100 into a broader system. Energy collectors 100 may be connected, without limitation in series, or in parallel with one another, and with end uses or thermal energy storage. Thereby, the amount of solar energy collected can be tailored to fit a particular need or to cover a given surface to collect as much solar energy as is incident upon it. The connection between the energy collectors 100 may be sealed to maintain a vacuum environment throughout the entire system. For example, the vacuum jacketed conduits of each energy collector 100 may be in fluid communication with one another to share the vacuum environment and form a common vacuum manifold. As one example, the seal between the energy collectors 100 may be a polymer seal. One or more vacuum pumps may be coupled to the multiple energy collectors 100 to create and maintain the vacuum environment; however, it is contemplated that the one or more vacuum pumps do not need to operate continuously to maintain the low pressure environment and that the pumps may be omitted from the system.

As shown in 9, the energy collectors 100 may be linked in a system such that the vapor outlet manifold 114 and the liquid inlet manifolds 115 and 116 of an energy collector 100 are in fluid communication with the respective vapor outlet manifolds 114 and liquid inlet manifolds 115, 116 of the other energy collectors 100 in the system. In the system shown in FIG. 9, the vapor outlet manifold 114 collects vapor from an absorber 117 and delivers it to an interconnected series of energy collectors 100, where it may eventually be delivered to an end use. The liquid inlet manifolds 115 and 116 return liquid to the absorber 117 from an end use, where it is re-vaporized by the absorber. In the case where the manifolds 114, 115, 116 are made of CSST or CST, the manifolds 114, 115, 116 may serve as thermal expansion joints to allow for connection to, and misalignment of, other energy collectors in a broader system including other collectors, structures, and end uses. In other embodiments, multiple energy collectors 100 may be placed together with direct connections between them to allow working fluid 157 to pass therethrough. In yet another embodiment, one or more energy collectors 100 may be connected to each other with vacuum jacketed conduits such that the energy collectors 100 and vacuum jacketed conduits are in fluid communication with one another to share vacuum pumps and form a common vacuum manifold.

As shown in FIG. 9, the energy collector or collectors 100 may be mounted at an angle α, such as, for example, between 5 and 90 degrees, from horizontal. In this embodiment, all fluid passages in the fluid cavity 131 within the absorber 117 provide an uphill path for vapor bubbles to rise between the liquid inlet manifolds 115 and 116 and the vapor outlet manifold 114.

With reference to FIG. 9, the one or more energy collectors 100 may be connected to one or more end uses, providing phase change heat transfer to the end uses; to one or more thermal energy storage devices, providing phase change heat transfer to such devices to be stored for later use; or to both. The one or more thermal energy storage devices may be connected to one or more end uses, providing phase change heat transfer from the one or more storage devices to the one or more end uses, allowing operation of the end uses when solar energy is not available (e.g., at night, or when there is cloud cover).

The one or more energy collectors 100 may be mounted to one or more buildings and serve several purposes within the one or more buildings. In one embodiment, the one or more energy collectors 100 collect solar energy and provide the one or more buildings with energy. The energy may be used, for example, to heat or cool the building or to operate various appliances within the building. For example, where there is no coating on the absorber 117 and the radiation penetrable cover 113 is transparent to infrared wavelengths of radiation, the one or more energy collectors 100 may be used for direct cooling of the one or more buildings, or process streams. In another embodiment, the one or more energy collectors 100 collect solar energy and provide the buildings with insulation. With respect to FIG. 2, the base manifold 154 may provide insulation both to the absorber 117 and to a building on which the energy collector 100 is mounted. In another embodiment, the one or more energy collectors 100 may be mounted to the roof of one or more buildings to both collect solar energy and act as an outer layer of roofing material. In yet another embodiment, the one or more energy collectors 100 may be integral to the roof of one or more buildings to both collect solar energy and act as a structural member of the roof.

In another embodiment, systems of energy collectors 100 can be aggregated between buildings, using vacuum jacketed conduits, to form a district heating system. Such systems can take advantage of economies of scale in terms of the production of energy collector systems, as well as end uses. Such systems can help mitigate reductions in energy collection when part of the system, or entire subsystems, are covered by shade.

Method of Use

Figure 10:
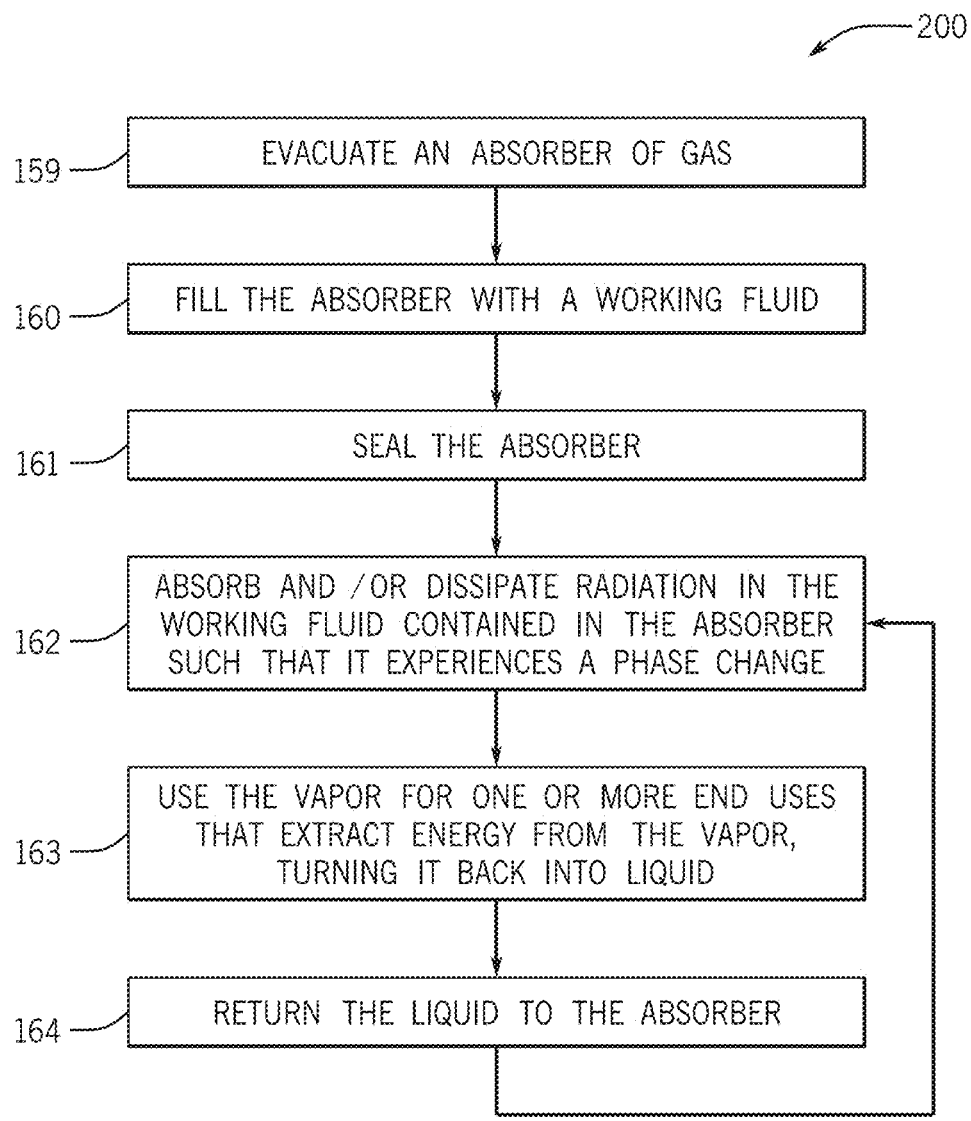
FIG. 10 is a flow chart illustrating a method for using the energy collector of FIG. 1.

FIG. 10 is a flow chart illustrating a method for using the energy collector 100 of FIG. 1. The method 200 begins with operation 159 and an absorber 117 is evacuated of any air or other residual fluids. The absorber 117 may be evacuated of air or other residual fluids by a vacuum pump 198 or tube coupled to the absorber 117, creating a low-pressure environment. By evacuating the absorber 117, phase change heat transfer during operation may occur at temperatures below the normal boiling point (at normal sea level atmospheric pressure) of the working fluid 157.

After operation 159, the method 200 proceeds to operation 160 and a working fluid 157 is loaded within the absorber 117. Depending on the temperature range of interest of the system, different materials may be used as the working fluid 157, based on different vapor pressures. For example, working fluid 157 used for moderate temperature systems (e.g., about 0-150 degrees Celsius) (e.g., for space heating, hot water, single effect absorption chillers) may be water. As another example, working fluid 157 used for higher temperature systems (e.g., about 75 to 200 degrees Celsius) (e.g., for heat engine or multi effect absorption chillers) may be propylene glycol. The working fluid 157 may also vary for other reasons, such as, for example based on the vapor pressure or cost.

After operation 160, the method 200 proceeds to operation 161 and the absorber 117 is sealed. The absorber may be sealed by ultrasonic soldering or by a fluid impermeable material, such as, for example, a fluor elastomer seal. The seal is both structurally strong and impervious to vacuum leaks to maintain the vacuum environment within the absorber 117.

After operation 160, the method 200 proceeds to operation 162 and the absorber 117 is configured to absorb and/or dissipate radiation. The absorber 117 may be coated with a selective emissivity coating to absorb different wavelengths of radiation. The absorber 117 is exposed to solar radiation and a top surface 176 of the absorber 117 absorbs particular wavelengths of radiation, depending upon the material of the absorber 117 and/or the coating. The solar radiation may come directly from the sun or it may be produced by a UV light.

After operation 162, the method 200 proceeds to operation 163 and the vapor is used for one or more end uses wherein some of the working fluid 157 returns to the liquid phase. The vapor may be transported through one or more conduits to the one or more end uses. It is contemplated that a fluid pump may be used to transport the vapor; however, the vapor may automatically move throughout the system based on temperature and pressure differences. For example, the energy collector 100 may have a higher temperature than the end use, causing the vapor to move from the higher temperature environment to the end use with the lower temperature environment. The one or more end uses may include an absorption chiller to provide space cooling, an air heat exchanger to provide space heating, a water heat exchanger to provide hot water, a heat engine to produce mechanical work, a generator to produce electrical energy, and the like. When the end use uses the energy from the vapor, at least some of the vapor condenses back into a liquid.

After operation 163, the method 200 proceeds to operation 164 and the working fluid 157 liquid returns to the absorber 117 to repeat the method. The working fluid 157 liquid may return to the absorber 117 through one or more conduits. Again, a fluid pump may be used to return the working fluid 157 liquid back to the absorber 117; however, it is also contemplated that the liquid may automatically move through the system based on temperature and pressure differences.

By creating the vacuum environment at operation 159 prior to filling the absorber 117 with the working fluid 157 at operation 160, any vapor pressure within the absorber 117 is the vapor pressure of the working fluid 157 at a given temperature and pressure. Thus, the working fluid 157 is a mixture of liquid and vapor. In other words, the fluid may experience consistent phase change beneath the vapor dome, and sensible heating may be minimized. So long as the working fluid 157 remains a mix of liquid and vapor, energy can be added to or removed from the absorber without substantially changing the temperature of the working fluid 157, at a given pressure. The difference between the working fluid 157 temperature and the ambient environmental temperature drives heat loss from an energy collector; the higher the difference, the higher the heat loss. By operating within the vapor dome, the difference between the ambient temperature and the temperature of the working fluid 157 is minimized, heat losses are minimized, and the efficiency of the energy collector is maximized.

Efficiency Test Method

Figure 11:
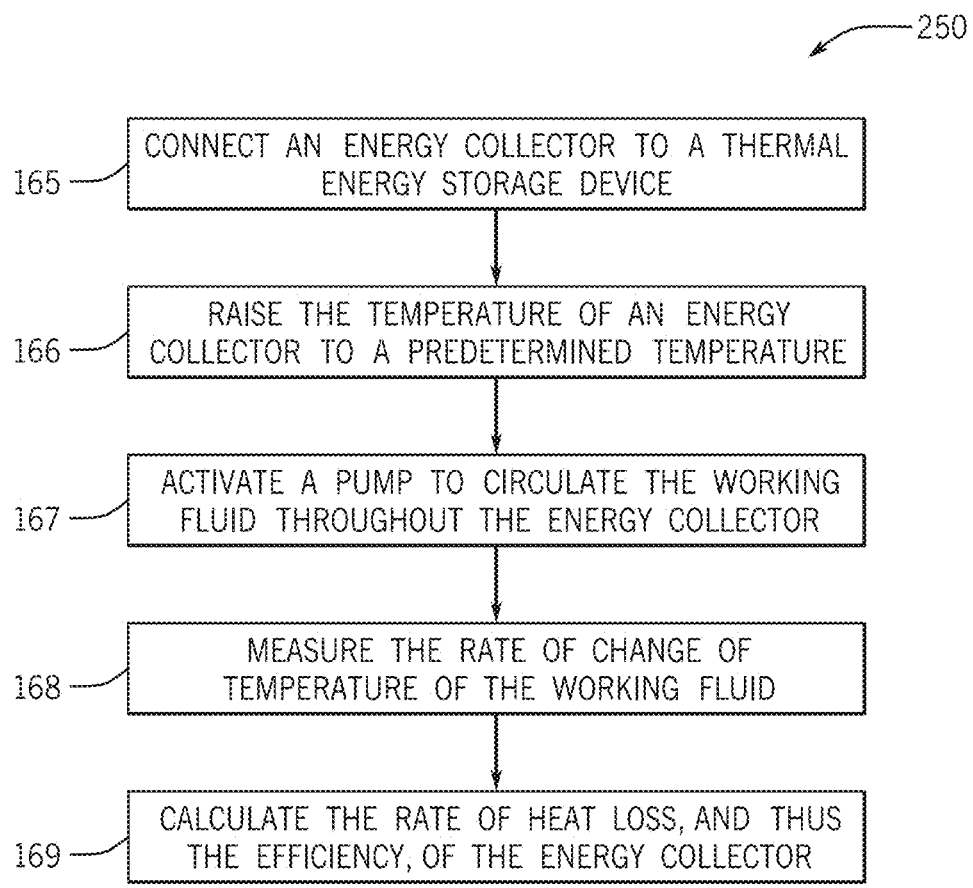
FIG. 11 is a flow chart illustrating a method for testing an energy collector.

FIG. 11 is a flowchart illustrating a method for testing an energy collector according to the various embodiments contained in this disclosure. Testing the efficiency of an energy collector that operates at constant temperature can be challenging. Therefore, a test method is disclosed wherein the efficiency of an energy collector is evaluated. The method 250 begins with operation 165 and an energy collector is connected to a thermal energy storage device. The thermal energy storage device may be any energy-using device, such as, for example, a generator, an absorption chiller, an air heat exchanger, a water heat exchanger, a heat engine, and the like.

After operation 165, the method 250 proceeds to operation 166 and the temperature of the energy collector is raised to a predetermined temperature. For example, the absorber 117 may be exposed to UV radiation for a period of time until the energy collector 100 reaches the predetermined temperature. Once the collector 100 reaches the predetermined temperature, the heat source may be removed to avoid overheating. In one example, a UV lamp is used and turned off once the predetermined temperature is obtained. For example, the temperature of the energy collector may be raised to 100 degrees Celsius.

After operation 166, the method 250 proceeds to operation 167 and a pump 198 is activated to circulate the working fluid 157 throughout the energy collector 100. The working fluid 157 absorbs some of the heat energy from the absorber 117 and carries the heat energy as it circulates throughout the energy collector 100 and to the thermal energy storage device.

After operation 167, the method 250 proceeds to operation 168, and the rate of change of temperature of the working fluid is measured. Prior to heating the collector 100, the temperature of the working fluid may be determined. After heating the collector to the predetermined temperature, the temperature of the working fluid may again be determined over different time intervals. The change in temperature of the working fluid over time may then be calculated.

After operation 168, the method proceeds to operation 169, and the rate of heat loss, and thus the efficiency, of the energy collector is calculated. With a known temperature of the energy collector, and a known amount of heat transfer to the working fluid, the amount of heat that is not transferred to the working fluid, or is lost, may be calculated. The more efficient the energy collector, the less heat loss. Thus, the efficiency of the energy collector may be determined based on the amount of heat loss calculated.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An energy collector comprising:
a base for supporting the energy collector on a support surface;
a plurality of support features positioned within and operably coupled to the base, each support feature defining an alignment recess;
an absorber that absorbs solar radiation, comprising:
    a first heat retaining member comprising a plurality of first heat retaining member apertures defined therethrough;
    a second heat retaining member comprising a plurality of second heat retaining member apertures defined therethrough, wherein the second heat retaining member is operably coupled to the first heat retaining member so as to define a fluid cavity therebetween configured to receive a working fluid therein and the first heat retaining member is coupled to and aligned with the second heat retaining member such that the first heat retaining member apertures and the second heat retaining member apertures are aligned with one another;
a plurality of alignment protrusions coupled to the absorber, each of the alignment protrusions having a shape corresponding to at least one alignment recess, wherein the plurality of alignment protrusions are received within the plurality of alignment recesses to align the absorber and the base;
a plurality of force distribution pillars coupled to the base and received through the first heat retaining member apertures and the second heat retaining member apertures of the absorber;
a radiation penetrable cover coupled to the base and positioned on an end of each of the plurality of force distribution pillars, such that the force distribution pillars support the radiation penetrable cover at a set distance from the absorber; and
a base manifold defined between the second heat retaining member and a top surface of the base, wherein the base manifold and the absorber are under vacuum such that as the absorber absorbs radiation from a radiation source, the working fluid received within the fluid cavity experiences a phase change.

2. An energy collector comprising:
a base for supporting the energy collector on a support surface;
a plurality of support features positioned within and operably coupled to the base, each support feature defining an alignment recess;
an absorber that absorbs solar radiation, comprising:
    a first heat retaining member comprising a plurality of first heat retaining member apertures defined therethrough;
    a second heat retaining member comprising a plurality of second heat retaining member apertures defined therethrough, wherein the second heat retaining member is operably coupled to the first heat retaining member so as to define a fluid cavity therebetween configured to receive a working fluid therein and the first heat retaining member is coupled to and aligned with the second heat retaining member such that the first heat retaining member apertures and the second heat retaining member apertures are aligned with one another;
a plurality of alignment protrusions coupled to the absorber, each of the alignment protrusions having a shape corresponding to at least one alignment recess, wherein the plurality of alignment protrusions are received within the plurality of alignment recesses to align the absorber and the base;
a plurality of force distribution pillars coupled to the base and received through the first heat retaining member apertures and the second heat retaining member apertures of the absorber;
a radiation penetrable cover coupled to the base and positioned on an end of each of the plurality of force distribution pillars, such that the force distribution pillars support the radiation penetrable cover at a set distance from the absorber; and
a base manifold defined between the second heat retaining member and a top surface of the base, wherein the base manifold is under vacuum such that as the absorber absorbs radiation from a radiation source, the working fluid received within the fluid cavity experiences a phase change, wherein
a pressure inside the energy collector is maintained such that a mean free path of gas molecules within the energy collector is longer than a distance between a top surface of the absorber and a bottom surface of the radiation penetrable cover.

3. The energy collector of claim 1, wherein the first heat retaining member and the second heat retaining member comprise a material selected from the group of steel, copper or alloys thereof, and a polymer-based material.

4. The energy collector of claim 1, wherein the first heat retaining member and the second heat retaining member further comprise connective retaining features to form the fluid cavity, wherein one or more of the connective retaining features comprise one or more of the plurality of first and second heat retaining member apertures.

5. The energy collector of claim 4, wherein the connective retaining features are formed by stamping or by welding the first heat retaining member and the second heat retaining member to one another.

6. The energy collector of claim 1, wherein the plurality of force distribution pillars are spaced apart from edges of the plurality of first and second heat retaining member apertures.

7. The energy collector of claim 1, wherein the absorber maximizes contact area with the working fluid and minimizes contact area with the base.

8. The energy collector of claim 1, wherein the radiation penetrable cover and the base are ultrasonically soldered together.

9. The energy collector of claim 1, wherein the absorber further comprises a coating having a selective emissivity.

10. The energy collector of claim 1, further comprising multi-layer insulation contained within the base manifold.

11. The energy collector of claim 1, wherein the force distribution pillars comprise a body and a removable head, the removable head comprising a flare, a support face, and a neck, wherein the neck restricts conductive heat flow.

12. The energy collector of claim 11, further comprising a sealing compound interposed between the removable head of the force distribution pillar and the radiation penetrable cover.

13. The energy collector of claim 1, further comprising a vapor outlet manifold and a liquid inlet manifold coupled to the base, wherein the fluid vapor outlet manifold has a diameter large enough to minimize pressure drop of the working fluid.

14. The energy collector of claim 13, wherein the vapor outlet manifold and the liquid inlet manifold comprise convoluted stainless steel tube or convoluted steel tube.

15. The energy collector of claim 13, wherein the vapor outlet manifold comprises an inner shell and an outer shell forming an annular vacuum jacket, wherein a pressure inside the annular vacuum jacket is maintained such that a mean free path of gas molecules within the annular vacuum jacket is longer than a distance between an outer surface of the inner shell and an inner surface of the outer shell, and wherein a pressure of the base manifold is maintained through fluid communication with the annular vacuum jacket.

16. An energy collector system comprising:
one or more energy collectors fluidly coupled to one another, each energy collector comprising:
a base for supporting the energy collector on a support surface;
a plurality of support features positioned within and operably coupled to the base, each support feature defining an alignment recess;
an absorber that absorbs solar radiation, comprising:
a first heat retaining member comprising a plurality of first heat retaining member apertures defined therethrough;
a second heat retaining member comprising a plurality of second heat retaining member apertures defined therethrough, wherein the second heat retaining member is operably coupled to the first heat retaining member so as to define a fluid cavity therebetween configured to receive a working fluid therein and the first heat retaining member is coupled to and aligned with the second heat retaining member such that the first heat retaining member apertures and the second heat retaining member apertures are aligned with one another;
a plurality of alignment protrusions coupled to the absorber, each of the alignment protrusions having a shape corresponding to at least one alignment recess, wherein the plurality of alignment protrusions are received within the plurality of alignment recesses to align the absorber and the base;
a plurality of force distribution pillars coupled to the base and received through the first heat retaining member apertures and the second heat retaining member apertures of the absorber;
a radiation penetrable cover coupled to the base and positioned on an end of the plurality of force distribution pillars, such that the force distribution pillars support the radiation penetrable cover at a set distance from the absorber; and
a base manifold defined between the second heat retaining member and a top surface of the base, wherein the base manifold and the absorber are under vacuum such that as the absorber absorbs radiation from a radiation source, the working fluid experiences a phase change.

17. The system of claim 16, wherein one or more energy collectors are connected with one or more vapor outlet manifolds and one or more liquid inlet manifolds, wherein the fluid vapor outlet manifolds and fluid liquid inlet manifolds are in fluid communication with a common vacuum pump.

18. The system of claim 16, further comprising at least one of an end use or a thermal energy storage device, wherein the end use or thermal energy storage device receives phase-change heat transfer from the one or more energy collectors.

19. The system of claim 16, wherein the one or more energy collectors are integral to a roof for a building.

20. The system of claim 16, wherein the radiation penetrable cover is transparent to infrared wavelengths of radiation.

* * * * *